United States Patent
Wassel

(10) Patent No.: US 11,959,631 B2
(45) Date of Patent: Apr. 16, 2024

(54) LIGHTING FIXTURE

(71) Applicant: APPALACHIAN LIGHTING SYSTEMS, INC., Ellwood City, PA (US)

(72) Inventor: James J. Wassel, Fombell, PA (US)

(73) Assignee: Appalachian Lighting Systems, Inc., Ellwood City, PA (US)

( * ) Notice: Subject to any disclaimer, the term of this patent is extended or adjusted under 35 U.S.C. 154(b) by 212 days.

(21) Appl. No.: 15/186,142

(22) Filed: Jun. 17, 2016

(65) Prior Publication Data

US 2016/0302281 A1 Oct. 13, 2016
US 2024/0060622 A9 Feb. 22, 2024

Related U.S. Application Data

(63) Continuation of application No. 13/692,402, filed on Dec. 3, 2012, now Pat. No. 9,699,854, which is a
(Continued)

(51) Int. Cl.
*F21V 29/74* (2015.01)
*F21S 8/02* (2006.01)
(Continued)

(52) U.S. Cl.
CPC ............ *F21V 7/005* (2013.01); *F21S 8/026* (2013.01); *F21S 8/086* (2013.01); *F21V 7/00* (2013.01);
(Continued)

(58) Field of Classification Search
CPC ........... F21S 8/026; F21S 8/086; F21V 29/74; F21V 7/048; F21V 7/05; F21V 7/22; H05B 33/0854
See application file for complete search history.

(56) References Cited

U.S. PATENT DOCUMENTS

| D122,909 S | 10/1940 | Stern |
|---|---|---|
| 2,368,810 A | 2/1945 | Donnelly |

(Continued)

FOREIGN PATENT DOCUMENTS

| CN | 101101096 A | 1/2008 |
|---|---|---|
| CN | 101191591 A | 6/2008 |

(Continued)

OTHER PUBLICATIONS

"Cree® XLamp® XR-E LED Data Sheet," Cree LED Light, 2006-2007.
(Continued)

*Primary Examiner* — Leah Simone Macchiarolo
(74) *Attorney, Agent, or Firm* — Panovia PLLC

(57) ABSTRACT

A light emitting diode (LED) lighting arrangement for a lighting fixture includes: a lighting strip comprising a plurality of light emitting diodes (LEDs) arranged along a length of the lighting strip; a first multi-faceted side wall reflector extending from a first side of the lighting strip at an angle such that the first multi-faceted side wall reflector extends along an entire length of the lighting strip and away from a bottom portion of a light emitting portion of each of the light emitting diodes (LEDs); and a second multi-faceted side wall reflector extending from a second, opposite side of the lighting strip at an angle such that the second multi-faceted side wall reflector extends along an entire length of the lighting strip away from the bottom portion of the light emitting portion of each of the light emitting diodes (LEDs). The first and second multi-faceted side wall reflectors cause light produced by the plurality of light emitting diodes (LEDs) to be amplified and formed into a uniform beam.

24 Claims, 24 Drawing Sheets

Related U.S. Application Data continuation of application No. 12/341,798, filed on Dec. 22, 2008, now Pat. No. 8,322,881.

(60) Provisional application No. 61/094,571, filed on Sep. 5, 2008, provisional application No. 61/094,558, filed on Sep. 5, 2008, provisional application No. 61/015,713, filed on Dec. 21, 2007.

(51) Int. Cl.

| | | |
|---|---|---|
| F21S 8/08 | (2006.01) | |
| F21V 7/00 | (2006.01) | |
| F21V 7/04 | (2006.01) | |
| F21V 7/28 | (2018.01) | |
| F21V 17/16 | (2006.01) | |
| F21V 23/04 | (2006.01) | |
| H05B 45/10 | (2020.01) | |
| H05B 47/11 | (2020.01) | |
| H05B 47/16 | (2020.01) | |
| F21W 131/103 | (2006.01) | |
| F21Y 101/00 | (2016.01) | |
| F21Y 103/10 | (2016.01) | |
| F21Y 105/10 | (2016.01) | |
| F21Y 113/00 | (2016.01) | |
| F21Y 115/10 | (2016.01) | |
| H05B 45/12 | (2020.01) | |
| H05B 47/19 | (2020.01) | |
| H05B 47/195 | (2020.01) | |

(52) U.S. Cl.
CPC .......... *F21V 7/048* (2013.01); *F21V 7/28* (2018.02); *F21V 17/164* (2013.01); *F21V 23/04* (2013.01); *F21V 29/74* (2015.01); *H05B 45/10* (2020.01); *H05B 47/11* (2020.01); *H05B 47/16* (2020.01); *F21W 2131/103* (2013.01); *F21Y 2101/00* (2013.01); *F21Y 2103/10* (2016.08); *F21Y 2105/10* (2016.08); *F21Y 2113/00* (2013.01); *F21Y 2115/10* (2016.08); *H05B 45/12* (2020.01); *H05B 47/19* (2020.01); *H05B 47/195* (2020.01)

(56) References Cited

U.S. PATENT DOCUMENTS

| | | |
|---|---|---|
| 2,379,798 A | 7/1945 | Guth |
| 2,420,943 A | 5/1947 | Freeman |
| 2,422,378 A | 6/1947 | Welch |
| D150,830 S | 9/1948 | Duepner |
| 2,487,468 A | 11/1949 | Freeman |
| 2,537,398 A | 1/1951 | Dameral |
| 2,567,014 A | 9/1951 | Fine et al. |
| 2,619,585 A | 11/1952 | Fine et al. |
| 2,678,380 A | 5/1954 | Westby |
| 2,908,197 A | 10/1959 | Wells et al. |
| 3,025,391 A | 3/1962 | Golko |
| 3,123,308 A | 3/1964 | Franck |
| 3,247,368 A | 4/1966 | McHugh |
| 3,592,700 A | 7/1971 | Toy |
| 3,665,201 A | 5/1972 | Shea et al. |
| D232,257 S | 7/1974 | Paulson |
| D239,780 S | 5/1976 | Paulson |
| 4,041,306 A | 8/1977 | Compton et al. |
| 4,213,182 A | 7/1980 | Eichelberger et al. |
| 4,307,150 A | 12/1981 | Roche |
| 4,719,546 A | 1/1988 | Spitz |
| 4,884,331 A | 12/1989 | Hinshaw |
| 4,933,821 A | 6/1990 | Anderson |
| 4,933,823 A | 6/1990 | Taylor |
| 5,301,122 A | 4/1994 | Halpern |
| 5,357,170 A | 10/1994 | Uchaco et al. |
| 5,521,330 A | 5/1996 | Kuwano |
| 5,578,839 A | 11/1996 | Nakamura et al. |
| 5,580,156 A | 12/1996 | Suzuki et al. |
| 5,723,868 A | 3/1998 | Hammond, Jr. et al. |
| 5,857,767 A | 1/1999 | Hochstein |
| 5,895,114 A * | 4/1999 | Thornton .............. F21V 17/107 362/306 |
| 6,028,396 A | 2/2000 | Morrissey, Jr. et al. |
| 6,050,707 A | 4/2000 | Kondo et al. |
| 6,078,425 A | 6/2000 | Wolfe et al. |
| D430,688 S | 9/2000 | Plunk |
| 6,241,367 B1 | 6/2001 | Wedell et al. |
| 6,250,774 B1 | 6/2001 | Begemann et al. |
| 6,257,735 B1 | 7/2001 | Haar |
| 6,257,737 B1 | 7/2001 | Marshall et al. |
| 6,296,376 B1 | 10/2001 | Kondo et al. |
| 6,318,886 B1 | 11/2001 | Stopa |
| D463,058 S | 9/2002 | Nourishad |
| 6,452,217 B1 | 9/2002 | Wojnarowski et al. |
| 6,452,339 B1 | 9/2002 | Morrissey et al. |
| 6,481,130 B1 | 11/2002 | Wu |
| 6,510,265 B1 | 1/2003 | Giaretta et al. |
| 6,547,416 B2 | 4/2003 | Pashley et al. |
| 6,577,512 B2 | 6/2003 | Tripathi et al. |
| 6,586,890 B2 | 7/2003 | Min et al. |
| 6,641,284 B2 | 11/2003 | Stopa et al. |
| 6,644,841 B2 | 11/2003 | Martineau |
| 6,648,490 B2 | 11/2003 | Klose |
| D490,927 S | 6/2004 | Keller |
| 6,784,357 B1 | 8/2004 | Wang |
| D496,121 S | 9/2004 | Santoro |
| 6,841,944 B2 | 1/2005 | Morrissey et al. |
| 6,853,151 B2 | 2/2005 | Leong et al. |
| 6,871,983 B2 | 3/2005 | Jacob et al. |
| 6,880,952 B2 * | 4/2005 | Kiraly ............... F21V 29/004 362/218 |
| D505,221 S | 5/2005 | Hetfield |
| 6,906,863 B2 | 6/2005 | Yoshida et al. |
| D509,616 S | 9/2005 | Hetfield |
| 6,942,361 B1 | 9/2005 | Kishimura et al. |
| 6,971,781 B2 | 12/2005 | Guy |
| 6,990,394 B2 | 1/2006 | Pasternak |
| 7,011,428 B1 | 3/2006 | Hand |
| 7,021,799 B2 | 4/2006 | Mizuyoshi |
| 7,067,992 B2 * | 6/2006 | Leong .................. F21K 9/00 315/291 |
| 7,090,370 B2 | 8/2006 | Clark et al. |
| 7,114,832 B2 | 10/2006 | Holder et al. |
| 7,119,498 B2 | 10/2006 | Baldwin et al. |
| 7,144,135 B2 | 12/2006 | Martin et al. |
| 7,150,553 B2 | 12/2006 | English |
| 7,167,777 B2 | 1/2007 | Budike, Jr. |
| 7,172,319 B2 | 2/2007 | Holder et al. |
| 7,196,459 B2 | 3/2007 | Morris |
| 7,198,386 B2 | 4/2007 | Zampini et al. |
| 7,202,608 B2 | 4/2007 | Robinson et al. |
| 7,213,940 B1 | 5/2007 | Van De Ven et al. |
| 7,215,088 B1 | 5/2007 | Clark et al. |
| 7,217,009 B2 | 5/2007 | Klose |
| 7,223,998 B2 | 5/2007 | Schwach et al. |
| D544,136 S | 6/2007 | Hargreaves |
| D544,138 S | 6/2007 | Hargreaves |
| D544,994 S | 6/2007 | Hargreaves |
| D544,995 S | 6/2007 | Hargreaves |
| D545,484 S | 6/2007 | Hargreaves |
| D545,485 S | 6/2007 | Hargreaves et al. |
| 7,233,115 B2 | 6/2007 | Lys |
| 7,244,058 B2 | 7/2007 | DiPenti et al. |
| 7,275,841 B2 | 10/2007 | Kelly |
| 7,278,761 B2 | 10/2007 | Kuan |
| 7,321,115 B2 | 1/2008 | Langlois et al. |
| 7,322,881 B2 * | 1/2008 | Ishii .................. B41J 2/1408 399/92 |
| 7,329,030 B1 | 2/2008 | Wang |
| D564,127 S | 3/2008 | Pandorf et al. |
| 7,347,706 B1 | 3/2008 | Wu et al. |
| 7,405,093 B2 | 7/2008 | Andrews |
| D574,548 S | 8/2008 | Wilcox et al. |

(56) References Cited

U.S. PATENT DOCUMENTS

| | | | |
|---|---|---|---|
| D574,549 S | 8/2008 | Kinnune et al. |
| 7,407,307 B2 | 8/2008 | Hiratsuka |
| D576,330 S | 9/2008 | Ruud et al. |
| D576,331 S | 9/2008 | Ruud et al. |
| D576,332 S | 9/2008 | Ruud et al. |
| D577,847 S | 9/2008 | Ruud et al. |
| 7,420,811 B2 | 9/2008 | Chan |
| D578,695 S | 10/2008 | Zheng et al. |
| D578,696 S | 10/2008 | Wang et al. |
| D578,697 S | 10/2008 | Zheng et al. |
| D578,698 S | 10/2008 | Zheng |
| 7,438,447 B2 | 10/2008 | Holder et al. |
| 7,529,594 B2 | 5/2009 | Walters et al. |
| 7,546,167 B2 | 6/2009 | Walters et al. |
| 7,546,168 B2 | 6/2009 | Walters et al. |
| 7,547,126 B2 * | 6/2009 | Hiratsuka | F21S 2/005 362/241 |
| 7,571,063 B2 | 8/2009 | Howell et al. |
| 7,593,229 B2 | 9/2009 | Shuy |
| 7,603,184 B2 | 10/2009 | Walters et al. |
| 7,637,633 B2 | 12/2009 | Wong |
| 7,643,908 B2 | 1/2010 | Quirino et al. |
| 7,648,257 B2 | 1/2010 | Villard |
| D610,736 S | 2/2010 | Klaus |
| 7,658,510 B2 | 2/2010 | Russell |
| D612,989 S | 3/2010 | Enriquez |
| 7,738,999 B2 | 6/2010 | Petite |
| 7,761,260 B2 | 7/2010 | Walters et al. |
| 7,766,508 B2 | 8/2010 | Villard et al. |
| 7,802,902 B2 | 9/2010 | Moss et al. |
| 7,847,486 B2 | 12/2010 | Ng |
| 7,911,359 B2 | 3/2011 | Walters et al. |
| 7,938,562 B2 | 5/2011 | Ivey et al. |
| 7,942,545 B2 | 5/2011 | Kassay et al. |
| 7,959,330 B2 | 6/2011 | Hashimoto et al. |
| 7,963,664 B2 | 6/2011 | Bertram et al. |
| 7,980,723 B2 | 7/2011 | Kosters |
| 8,092,037 B2 | 1/2012 | Kassay et al. |
| 8,140,279 B2 | 3/2012 | Subbloie |
| 8,186,855 B2 | 5/2012 | Wassel et al. |
| 8,232,745 B2 | 7/2012 | Chemel et al. |
| 8,322,881 B1 | 12/2012 | Wassel |
| 8,324,817 B2 | 12/2012 | Ivey et al. |
| 2001/0025842 A1 * | 10/2001 | Witt | A47J 37/0641 219/411 |
| 2003/0002282 A1 * | 1/2003 | Swaris | G09F 13/22 362/249.06 |
| 2003/0099107 A1 | 5/2003 | Tess |
| 2003/0117798 A1 | 6/2003 | Leysath |
| 2003/0227774 A1 | 12/2003 | Martin et al. |
| 2004/0037088 A1 | 2/2004 | English et al. |
| 2004/0109330 A1 | 6/2004 | Pare |
| 2004/0122930 A1 | 6/2004 | Pasternak |
| 2004/0264188 A1 * | 12/2004 | Tazawa | F21V 5/04 362/257 |
| 2005/0097162 A1 | 5/2005 | Budike, Jr. |
| 2005/0111220 A1 | 5/2005 | Smith |
| 2005/0116597 A1 | 6/2005 | Hsu |
| 2005/0128758 A1 | 6/2005 | Brick |
| 2005/0174473 A1 * | 8/2005 | Morgan | H05B 33/0803 348/370 |
| 2006/0051017 A1 | 3/2006 | Hallemeier et al. |
| 2006/0056169 A1 | 3/2006 | Lodhie et al. |
| 2006/0176695 A1 * | 8/2006 | Gordin | H05B 41/40 362/263 |
| 2006/0193139 A1 | 8/2006 | Sun et al. |
| 2006/0232984 A1 | 10/2006 | Schuknecht et al. |
| 2006/0237738 A1 | 10/2006 | Salam |
| 2006/0262545 A1 * | 11/2006 | Piepgras | F21V 29/773 362/373 |
| 2007/0002511 A1 | 1/2007 | Chaudhry |
| 2007/0002565 A1 | 1/2007 | Han et al. |
| 2007/0041345 A1 | 2/2007 | Yarvis et al. |
| 2007/0061050 A1 | 3/2007 | Hoffknecht |
| 2007/0062032 A1 | 3/2007 | Ter-Hovhannissian |
| 2007/0075325 A1 | 4/2007 | Baek et al. |
| 2007/0076427 A1 | 4/2007 | Reo et al. |
| 2007/0081339 A1 | 4/2007 | Chung et al. |
| 2007/0085701 A1 | 4/2007 | Walters et al. |
| 2007/0121343 A1 | 5/2007 | Brown |
| 2007/0153526 A1 | 7/2007 | Lim |
| 2007/0195527 A1 | 8/2007 | Russell |
| 2007/0201225 A1 | 8/2007 | Holder et al. |
| 2007/0211463 A1 | 9/2007 | Chevalier et al. |
| 2007/0217192 A1 | 9/2007 | Hiratsuka |
| 2007/0228289 A1 | 10/2007 | Kaszuba et al. |
| 2007/0230171 A1 | 10/2007 | Hiratsuka |
| 2007/0242473 A1 | 10/2007 | Lee |
| 2007/0247856 A1 | 10/2007 | Wang et al. |
| 2007/0263388 A1 | 11/2007 | Lai et al. |
| 2007/0285927 A1 | 12/2007 | Chen |
| 2008/0002399 A1 | 1/2008 | Villard et al. |
| 2008/0002410 A1 | 1/2008 | Burton et al. |
| 2008/0055908 A1 | 3/2008 | Wu et al. |
| 2008/0062689 A1 | 3/2008 | Villard |
| 2008/0062691 A1 | 3/2008 | Villard et al. |
| 2008/0078524 A1 | 4/2008 | Wilcox et al. |
| 2008/0080162 A1 | 4/2008 | Wilcox et al. |
| 2008/0080196 A1 | 4/2008 | Ruud et al. |
| 2008/0084115 A1 | 4/2008 | King et al. |
| 2008/0089069 A1 * | 4/2008 | Medendorp | F21S 8/04 362/294 |
| 2008/0089070 A1 | 4/2008 | Wang |
| 2008/0123340 A1 | 5/2008 | McClellan |
| 2008/0136661 A1 | 6/2008 | Pederson et al. |
| 2008/0167755 A1 | 7/2008 | Curt |
| 2008/0192476 A1 | 8/2008 | Hiratsuka |
| 2008/0198572 A1 | 8/2008 | Medendorp |
| 2008/0204888 A1 | 8/2008 | Kan et al. |
| 2008/0212329 A1 | 9/2008 | Duguay et al. |
| 2008/0219001 A1 * | 9/2008 | Russell | F21V 3/02 362/246 |
| 2008/0231201 A1 | 9/2008 | Higley et al. |
| 2008/0239722 A1 | 10/2008 | Wilcox |
| 2008/0239750 A1 | 10/2008 | Chang |
| 2008/0239751 A1 | 10/2008 | Chang |
| 2008/0247170 A1 | 10/2008 | Peck |
| 2008/0253122 A1 | 10/2008 | Hancock et al. |
| 2008/0253125 A1 | 10/2008 | Kang et al. |
| 2008/0273331 A1 * | 11/2008 | Moss | F21V 17/168 362/294 |
| 2008/0304267 A1 | 12/2008 | Lin |
| 2008/0316738 A1 | 12/2008 | Chen |
| 2009/0083167 A1 | 3/2009 | Subbloie |
| 2009/0085500 A1 | 4/2009 | Zampini, II et al. |
| 2009/0168395 A1 | 7/2009 | Mrakovich et al. |
| 2009/0248217 A1 | 10/2009 | Verfuerth et al. |
| 2009/0273433 A1 | 11/2009 | Rigatti et al. |
| 2009/0323334 A1 * | 12/2009 | Roberts | F21V 5/002 362/247 |
| 2010/0010683 A1 | 1/2010 | Kates |
| 2010/0094478 A1 | 4/2010 | Fails et al. |
| 2010/0102730 A1 | 4/2010 | Simon et al. |
| 2010/0141153 A1 | 6/2010 | Recker et al. |
| 2010/0148673 A1 * | 6/2010 | Stewart | H05B 45/37 315/121 |
| 2010/0264846 A1 | 10/2010 | Chemel et al. |
| 2010/0301769 A1 * | 12/2010 | Chemel | H05B 37/029 315/294 |
| 2010/0301771 A1 | 12/2010 | Chemel et al. |
| 2010/0301774 A1 | 12/2010 | Chemel et al. |
| 2011/0001436 A1 | 1/2011 | Chemel et al. |
| 2011/0083028 A1 | 4/2011 | Jung |
| 2011/0184581 A1 | 7/2011 | Storch et al. |
| 2012/0043909 A1 | 2/2012 | Bloom et al. |
| 2013/0107527 A1 * | 5/2013 | Boyer | F21V 7/005 362/241 |
| 2013/0107553 A1 * | 5/2013 | Desai | B64D 47/06 362/470 |
| 2013/0286637 A1 * | 10/2013 | Lay | F21K 9/17 362/147 |

(56) References Cited

U.S. PATENT DOCUMENTS

| | | | |
|---|---|---|---|
| 2014/0191665 A1 | 7/2014 | Gommans et al. | |
| 2014/0313727 A1* | 10/2014 | Dupre | F21V 29/773 362/287 |
| 2016/0302281 A1 | 10/2016 | Wassel | |

FOREIGN PATENT DOCUMENTS

| | | |
|---|---|---|
| DE | G9209699 | 6/1992 |
| DE | 202006010949 | 10/2006 |
| DE | 202006015832 | 1/2007 |
| DE | 102005051248 | 5/2007 |
| EP | 1298383 | 4/2003 |
| EP | 1371901 | 12/2003 |
| EP | 1471304 | 10/2004 |
| JP | 2004200102 A | 7/2004 |
| JP | WO005055328 | 6/2005 |
| WO | WO06089253 | 8/2006 |
| WO | WO 2007088665 A1 | 8/2007 |

OTHER PUBLICATIONS

"Power light source: LUXEON® Rebel," Technical Datasheet DS56, Philips, 2007.
Bibee, Greg, "Lighting Class' LED Design Basics," 2008.
Materials from *ALSI Holdings, LLC*, v *Current Lighting Solutions, LLC, d/b/a GE Current, a Daintree Company, and HLI Solutions, Inc., f/k/a Hubbell Lighting, Inc*, both d/b/a Hubbell Control Solutions and/or Current, in the U.S. District Court for the Western District of Texas, Waco Division, case No. 6:21-cv-01187-ADA ("Litigation")—Current Lighting's Preliminary Invalidity Contentions with Exhibits.
Litigation—Current Lighting's 2nd Preliminary Invalidity Contentions with Exhibits.
GaN-based LEDs with Al-deposited V-shaped sapphire facet mirror. IEEE Photonics Technology Letters, vol. 18, No. 5.
Internal omni-directional reflector using a low refractive index material for light-emitting diodes Print ISBN:1-55752-795-4 INSPEC Accession No. 8715996 DOI: 10.1109/CLEO.2005.201705.
Capkun, Anthony, "Hubbell Building Automation wiHUBB distributed wireless lighting control system," Energy Manager Canada, Oct. 9, 2011.
"An Introduction to Wireless Lighting Controls," web page <www.daintree.net/wireless-lighting-control/what-is-wireless-lighting-control.php>, Jul. 23, 2011, retrieved from Internet Archive Wayback Machine, date unknown.
"Daintree Networks Announces New ControlScope Connected Partners," BusinessWire, Lightfair International 2011, May 16, 2011.
Materials from *ALSI Holdings, LLC*, v *Current Lighting Solutions, Llc, d/b/a Ge Current, a Daintree Company, and HLI Solutions, Inc., f/k/a Hubbell Lighting, Inc*, both d/b/a Hubbell Control Solutions and/or Current, in the U.S. District Court for the Western District of Texas, Waco Division, case No. 6:21-cv-01187-ADA ("Litigation")—Complaint, Amended Complaint, Second Amended Complaint.
Litigation—Plaintiff ALSI Holdings, LLC's Preliminary Infringement Contentions with Exhibits A (U.S. Pat. No. 9,049,753), B (U.S. Pat. No. 8,186,855), C (U.S. Pat. No. 9,699,854), D (U.S. Pat. No. 8,322,881), E (U.S. Pat. No. 8,722,114), F (U.S. Pat. No. D. 612,088), G (U.S. Pat. No. D. 650,508).
Litigation—Plaintiff Alsi Holdings, LLC's Preliminary Infringement Contentions, Exhibit H (U.S. Pat. No. 9,049,753).
Litigation—Defendant's Claim Construction Brief with Exhibits 1-8.
"PSG Product Selection Guide," Hubbell Lighting, Inc. 2011, USA.
Materials from *ALSI Holdings, LLC*, v *Current Lighting Solutions, LLC, d/b/a Ge Current, a Daintree Company, and HLI Solutions, Inc., f/k/a Hubbell Lighting, Inc*, both d/b/a Hubbell Control Solutions and/or Current, in the U.S. District Court for the Western District of Texas, Waco Division, case No. 6:21-cv-01187-ADA ("Litigation")—Plaintiff ALSI Holdings, LLC's Responsive Claim Construction Brief ("Plaintiff CC Brief") with Declarations and Exhibits.
Litigation—Plaintiff CC Brief—Bretschneider Decl., Exs. 1-2.
Litigation—Plaintiff CC Brief—Shah Decl., Ex. Z.
Litigation—Plaintiff CC Brief—D'Andrade Decl., Exs. A, B.
Litigation—Defendants' Reply on Claim Construction, Josefowicz Decl.
Litigation—Plaintiff ALSI Holdings, LLC's Sur-Reply Claim Construction Brief, Bretschneider Decl. with Exs. 1-3.
Litigation—Joint Claim Construction Statement.
Litigation—Defendants' Motion for Leave To Provide Supplemental Claim Construction Briefing and to Adjourn the Aug. 29, 2022 Markman Hearing Date with Exs. 1-5.
Litigation—Plaintiff ALSI Holdings, LLC's Opposition to Defendants' Motion for Leave to Supplement with Exs. 1-5.
Litigation—Defendants' Reply in Support of Its Motion for Leave to Provide Supplemental Claim Construction Briefing and to Adjourn the Aug. 29, 2022 Markman Hearing Date.
Litigation—Order Setting Markman Hearing.
Litigation—Order Granting the Defendants' Opposed Motion for Leave to File Supplemental Claim Construction Briefs.
Litigation—Defendants' Supplemental Claim Construction Brief, Josefowicz Decl.
Litigation—Plaintiff ALSI Holdings, LLC's Response to Defendants' Supplemental Claim Construction Brief, Bretschneider decl, Gaum Decl. with Exs. 1-5.
Litigation—Supplemental Joint Claim Construction Statement.
Litigation—Final Claim Constructions of the Court.
*Current Lighting Solutions, LLC, and HLI Solutions, Inc.*, Petitioners, v. *ALSI Holdings, LLC* Patent Owner. Petition for Inter Partes Review of U.S. Pat. No. 8,322,881 to Wassel, case No. IPR2023-00145, Nov. 2, 2022 ("881 IPR").
881 IPR, Decl. of Jack Josefowicz.
881 IPR, *ALSI Holdings, LLC* v. *Current Lighting Solutions, LLC, d/b/a GE Current, A Daintree Company and HLI Solutions, Inc. f/k/a Hubbell Lighting, Inc.*, both d/b/a Hubbell Control Solutions and/or Current Case No. 6:21-cv-01187-ADA (W.D. Tex.), ALSI supplemental infringement contentions, U.S. Pat. No. 8,322,881.
*Current Lighting Solutions, LLC, and HLI Solutions, Inc.*, Petitioners, v. *ALSI Holdings, LLC* Patent Owner. Petition for Inter Partes Review of U.S. Pat. No. 8,721,114 to Wassel et al., case No. PR2023-00198, Nov. 15, 2022 ('114 IPR).
114 IPR, Decl. of Jack Josefowicz.
114 IPR, *ALSI Holdings, LLC* v. *Current Lighting Solutions, LLC, d/b/a GE Current, A Daintree Company and HLI Solutions, Inc. f/k/a Hubbell Lighting, Inc.*, both d/b/a Hubbell Control Solutions and/or Current Case No. 6:21-cv-01187-ADA (W.D. Tex.), ALSI supplemental infringement contentions, U.S. Pat. No. 8,721,114.
*Current Lighting Solutions, LLC, and HLI Solutions, Inc.*, Petitioners, v. *ALSI Holdings, LLC* Patent Owner. Petition for Inter Partes Review of U.S. Pat. No. 9,699,854 to Wassel, case No. IPR2023-00125, Oct. 28, 2022 ("854 IPR").
854 IPR, Decl. of Jack Josefowicz.
854 IPR, *ALSI Holdings, LLC* v. *Current Lighting Solutions, LLC, d/b/a GE Current, A Daintree Company and HLI Solutions, Inc. f/k/a Hubbell Lighting, Inc.*, both d/b/a Hubbell Control Solutions and/or Current Case No. 6:21-cv-01187-ADA (W.D. Tex.), ALSI supplemental infringement contentions, U.S. Pat. No. 9,699,854.
881 IPR, '114 IPR, '854 IPR; shared exhibits 1004, 1012-16, 1018, 1019, 1030-34, 1039, 1046 (except '114 IPR).
Curriculum Vitae of Dr. Jack Josefowicz.
How the Energy Independence and Security Act of 2007 Affects Light Bulbs _ US EPA—https://www.epa.gov/mercury/how-energy-independence-and-security-act-2007-affects-light- bulbs.
Recycling and Disposal of CFLs and Other Bulbs that Contain Mercury _ US EPA—https://www.epa.gov/cfl/recycling-and-disposal-cfls- and-other-bulbs-contain-mercury.
Disposal of Fluorescent Light Ballasts (FLB) _ US EPA—https://www.epa.gov/pcbs/disposal-fluorescent-light-ballasts-flb.
Nakamura, The Roles of Structural Imperfections in InGaN-Based Blue Light-Emitting Diodes and Laser Diodes, Science Magazine, vol. 281, pp. 956-961 at 956-957 (Aug. 14, 1998).

(56) References Cited

OTHER PUBLICATIONS

Nakada et. al., Improved Characteristics of InGaN Multiple-Quantum-Well Light-Emitting Diode by GaN/AlGaN distributed Reflector Grown on Sapphire, Applied Physics Letters, vol. 76, No. 14, pp. 1804-1806 (Apr. 3, 2000).

Nakamura et al., "Candela-Class High-Brightness InGaN/AlGaN Double-Heterostructure Blue-Light-Emitting Diodes," Appl. Phys. Lett. 64, pp. 1687-1689 (1994).

Mueller-Mach et al., Highly efficient all-nitride phosphor-converted white light emitting diode, Physica Status Solidi (A) Applications and Materials, vol. 202, Issue 9, pp. 1727-1732 at 1728 (Jun. 6, 2005).

Michael Gauvin et al., "Multi-CPU architecture speeds ray tracing," https://www.laserfocusworld.com/software-accessories/software/article/16553028/multicpu-architecture-speeds-ray-tracing.

National Lighting Product Information Program, Parking Lot and Area Luminaires, vol. 9(1) (2004).

Materials from *ALSI Holdings, LLC*, v *Current Lighting Solutions, LLC, d/b/a GE Current, a Daintree Company, and HLI Solutions, Inc., f/k/a Hubbell Lighting, Inc, both d/b/a Hubbell Control Solutions and/or Current*, in the U.S. District Court for the Western District of Texas, Waco Division, case No. 6:21-cv-01187-ADA, Final Claim Construction (Dkt. No. 73).

ES Standard for Roadway Lighting, RP-8-00 (2005).

IES Standard for Roadway Lighting, RP-8-14 (2014).

Lumen (unit)—McGraw Hill Dictionary of Scientific and Technical Terms.

Materials from *ALSI Holdings, LLC*, v *Current Lighting Solutions, LLC, d/b/a GE Current, a Daintree Company, and HLI Solutions, Inc., f/k/a Hubbell Lighting, Inc, both d/b/a Hubbell Control Solutions and/or Current*, in the U.S. District Court for the Western District of Texas, Waco Division, case No. 6:21-cv-01187-ADA, DN. 50—Scheduling Order.

114 IPR; exhibits 1054, 1055.

Declaration of Jack Josefowicz, Case 6:21-01187, Dkt. #57-1.

Declaration of Jack Josefowicz, Case 6:21-01187, Dkt. #68-1.

U.S. Pat. No. 223,898 [PTO SB/08] does not accept 6-digit patent numbers].

Materials from *ALSI Holdings, LLC*, v *Current Lighting Solutions, LLC, d/b/a GE Current, a Daintree Company, and HLI Solutions, Inc., f/k/a Hubbell Lighting, Inc, both d/b/a Hubbell Control Solutions and/or Current*, in the U.S. District Court for the Western District of Texas, Waco Division, case No. 6:21-cv-01187-ADA ("Litigation")—Defendant's Final Invalidity Contentions.

Vigilant Series LED Based Obstruction Lights. Dialight Brochure.

LED Based L-864/L-865 Flashing Dual (White/Red) Strobe. Dialight Website <www.dailight.com>.2007-2010.

LED Dual Flashing FAA Beacon. P&R Technologies, Inc. Brochure L-864/L-865 (Red/White).

\* cited by examiner

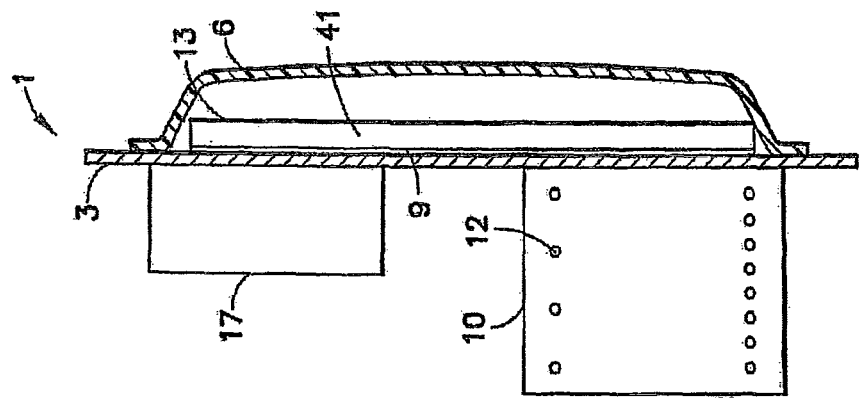
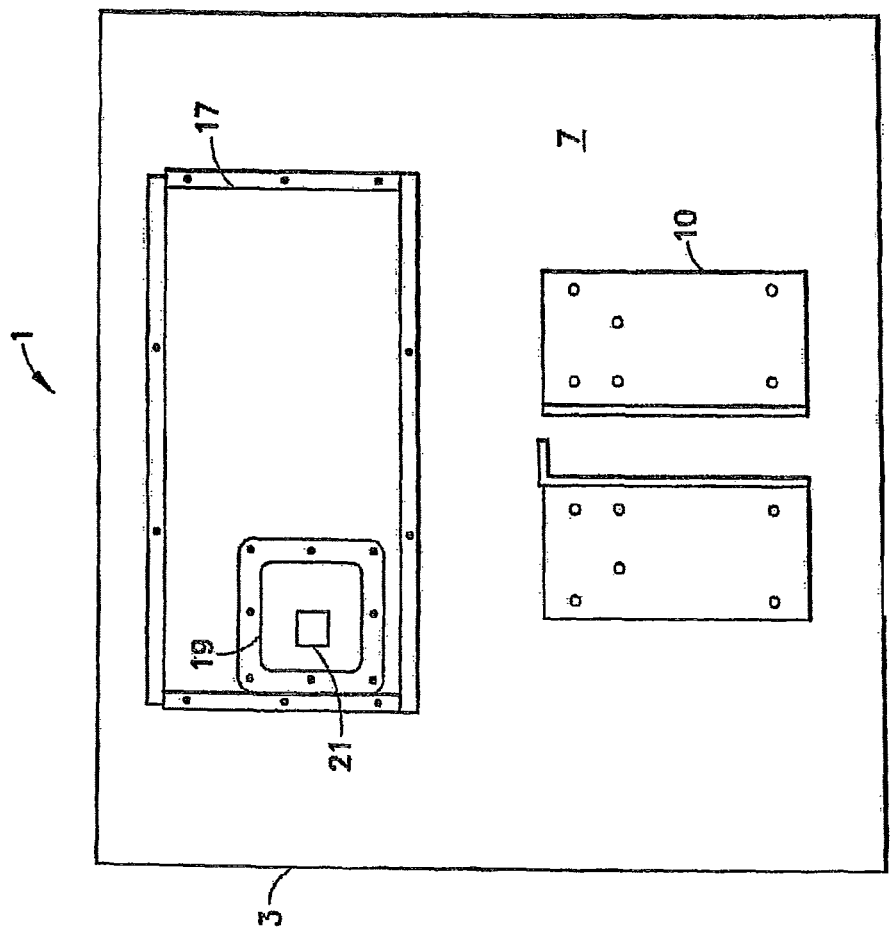

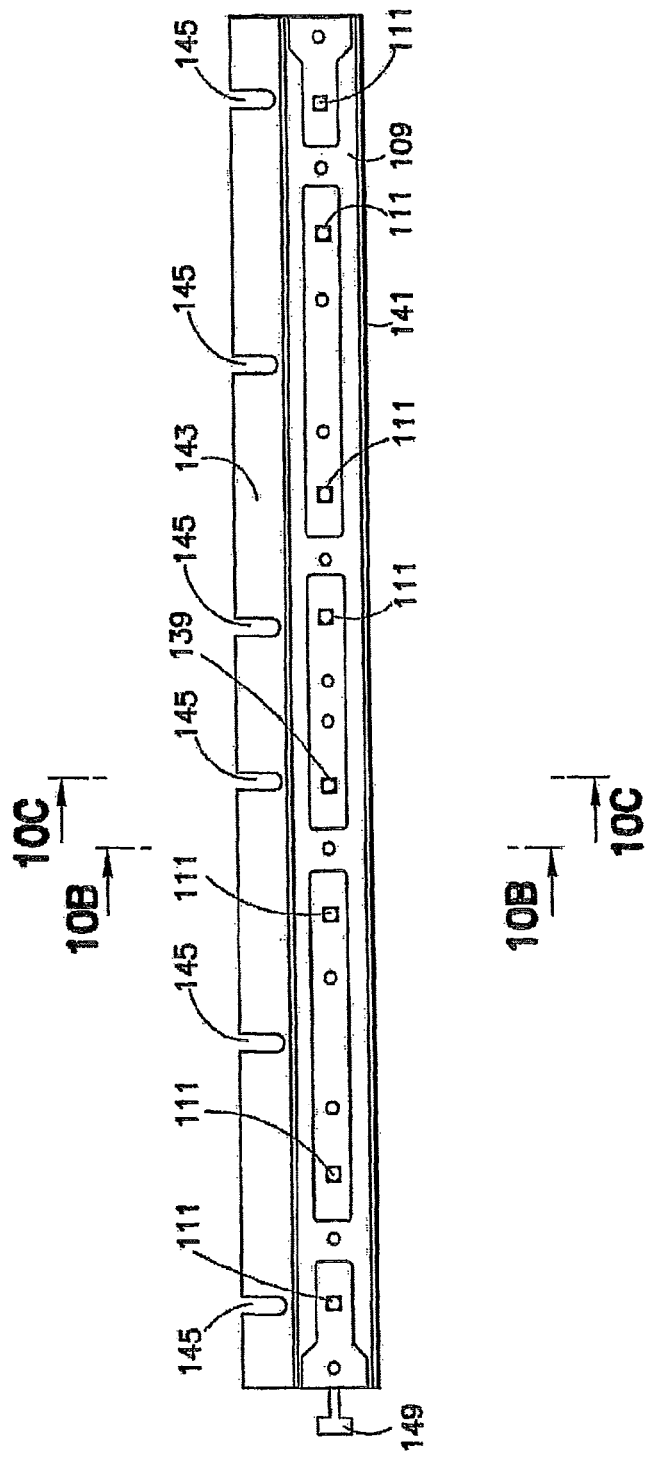

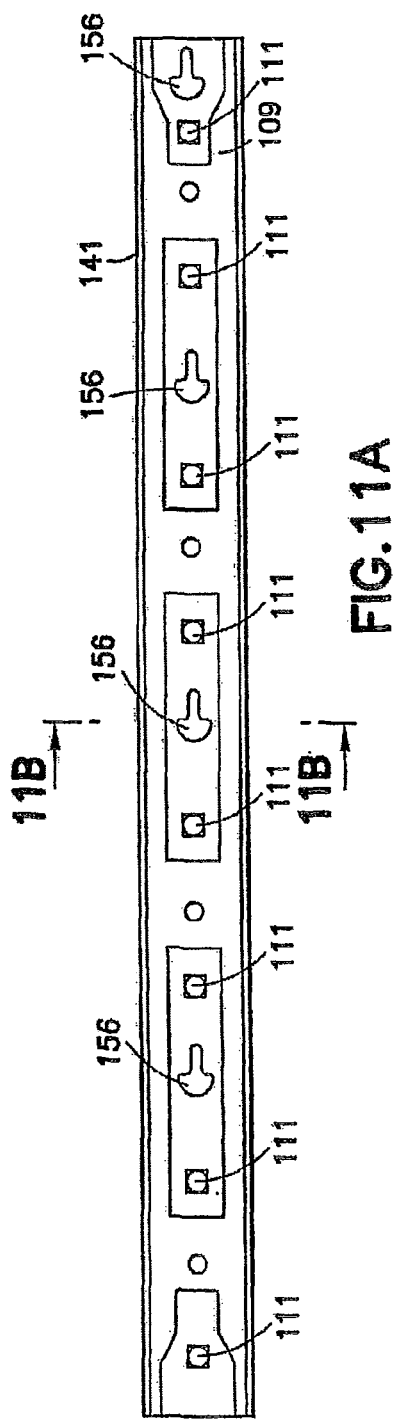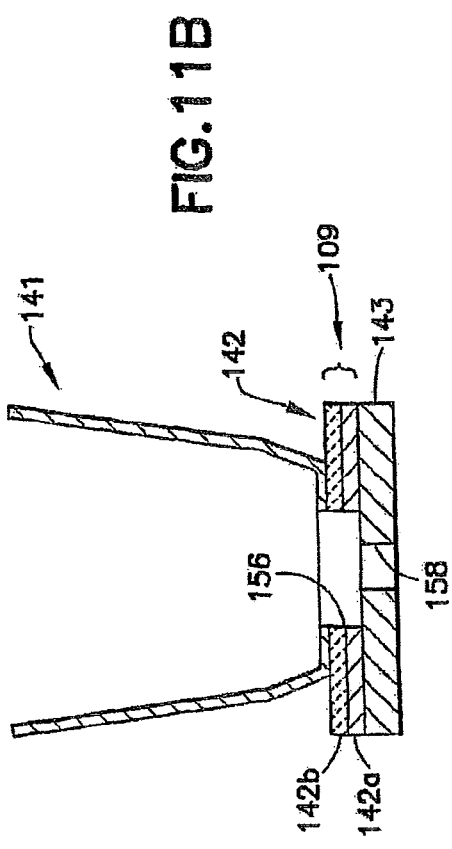

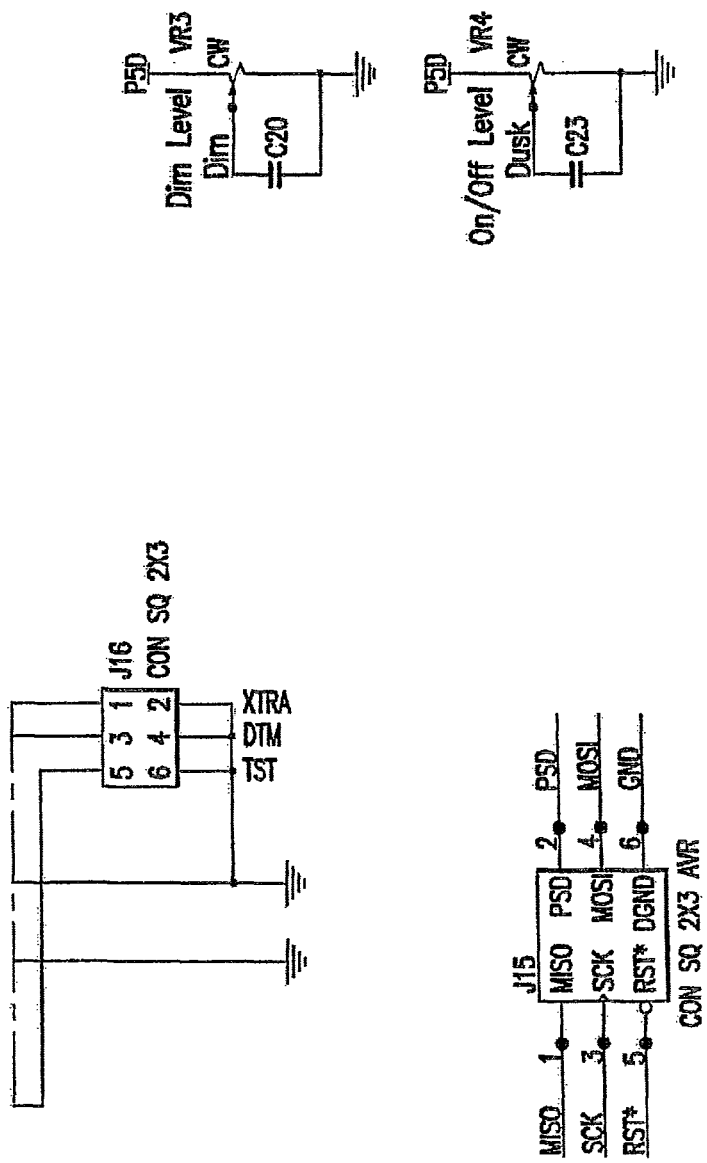

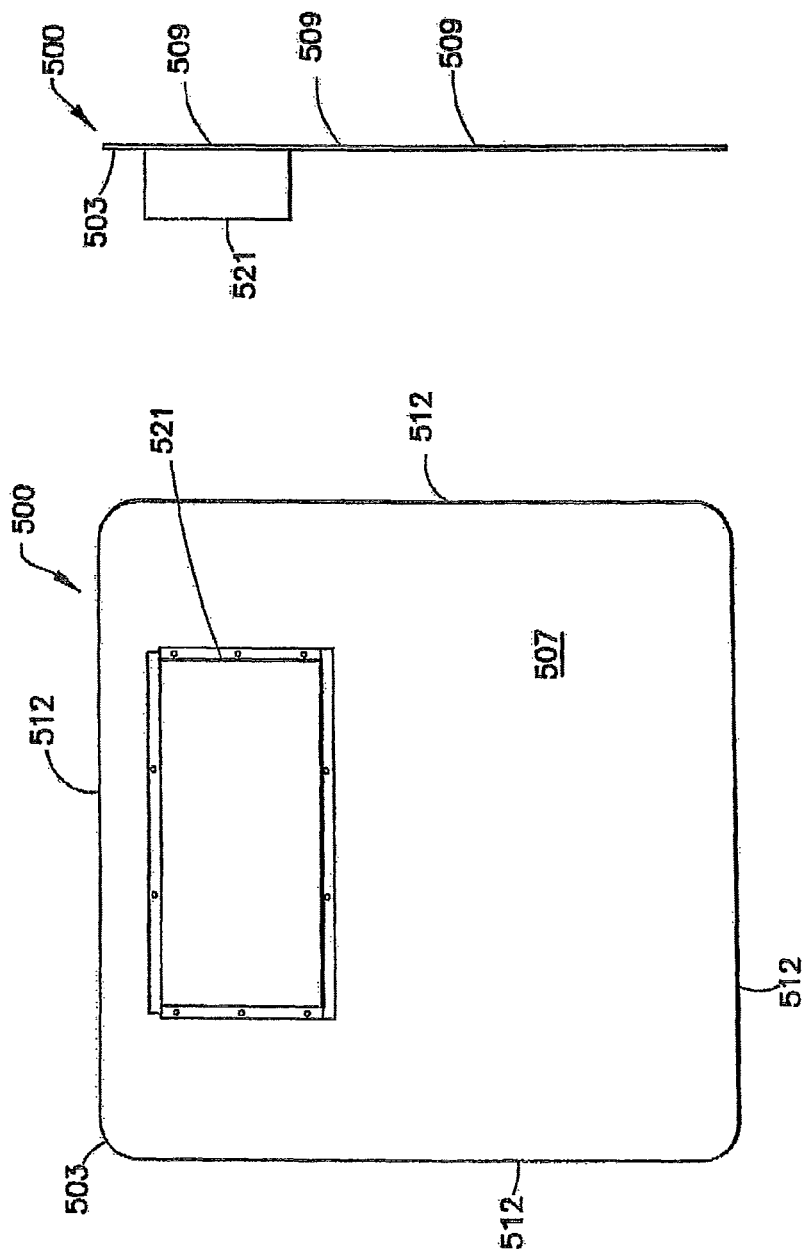

LIGHTING FIXTURE

CROSS REFERENCE TO RELATED APPLICATIONS

This application is a continuation of U.S. patent application Ser. No. 13/692,402, entitled "Lighting Fixture" filed on Dec. 3, 2012, which is a continuation of U.S. patent application Ser. No. 12/341,798, filed Dec. 22, 2008, which claims the benefit of U.S. Provisional Patent Application No. 61/015,713 entitled "Lighting Fixture" filed Dec. 21, 2007, U.S. Provisional Patent Application No. 61/094,558 entitled "Lighting Fixture with Improved Cover and Mounting Assembly" filed Sep. 5, 2008 and U.S. Provisional Patent Application No. 61/094,571 entitled "Reflectors for Use with a Lighting Fixture" filed Sep. 5, 2008, the contents of each of which are hereby incorporated by reference in their entirety.

BACKGROUND OF THE INVENTION

1. Field of the Invention

The present invention relates, in general, to lighting fixtures (luminaires) that utilize light emitting diodes (LEDs) as a light source and, more particularly, to lighting fixtures incorporating LEDs configured in a manner to amplify and direct light produced by such lighting fixtures.

2. Description of Related Art

Conventional lighting fixtures such as streetlights and office lights have typically utilized incandescent, halogen, or fluorescent bulbs to provide light. The use of incandescent and halogen bulbs has been problematic in a number of ways. First, incandescent light bulbs are very energy inefficient. A large percentage of the energy incandescent light bulbs consume is released as heat, rather than light. Although fluorescent bulbs are more efficient than incandescent light bulbs, fluorescent bulbs raise environmental concerns, and are still very inefficient when compared to LEDs or other similar solid state light emitters.

Additionally, incandescent and fluorescent light bulbs have short life spans when compared to solid state emitters. This requires lighting devices to be replaced more frequently. Such short life spans are particularly more problematic when used in overhead lighting in office buildings or in streetlights, where access may be difficult. Replacement is not only time consuming, but can be dangerous.

Furthermore, the unwanted heat produced in these lighting systems adds not only to additional energy costs but may also requires additional air conditioning to lower the temperature of the area lit by the system. For example, in large buildings, overhead lighting is typically provided by lights placed near the ceiling and directed downward. These buildings often require additional air conditioning to compensate for this energy produced as heat.

Although solid state emitters, such as LEDs, are known to be more energy efficient, LEDs have not been considered in the past as an option for providing quality light in many applications, such as streetlights and office lighting systems, because LEDs do not provide enough useful light at a distance. Moreover, LEDs are a new technology, and therefore are more expensive. Accordingly, extending the use of LEDs is a particularly desirable goal. More recently, high-powered LEDs have been developed, thereby providing useful light output for incorporating LEDs into lighting fixtures for use as streetlights and office lights. However, the use of LEDs in such lighting fixtures typically requires a large number of LEDs clustered closely together to provide useful light output. Accordingly, lighting fixtures incorporating LEDs in this manner generate a large amount of heat energy when the LEDs emit light. This heat energy has to be dissipated. If this heat energy is not effectively removed, the high temperature caused by the heat energy will reduce the luminance and life span of the LEDs. Therefore, each of the foregoing-described lighting fixtures requires a complex heat dissipating mechanism to adequately remove the heat energy produced by the large number of LEDs.

In view of the foregoing, a need exists for a lighting fixture for use, for example, as a streetlight or an office light that utilizes a minimal number of LEDs to produce useful light at a distance without creating excessive heat within the lighting fixture. A further need exists for an LED lighting fixture having a relatively simple heat dissipating mechanism. A need also exists for an LED lighting fixture that accomplishes amplified lighting with the use of a minimal number of LEDs.

SUMMARY OF THE INVENTION

As described in detail herein, a lighting fixture for use, for example, as a streetlight or an office light is disclosed and which provides useful light at a distance using only a small number of LEDs. Such a light fixture incorporates a relatively simple heat dissipating mechanism in accordance with this disclosure. In one embodiment, a light emitting diode (LED) lighting arrangement for a lighting fixture is provided. The LED arrangement includes a lighting strip having a plurality of light emitting diodes (LEDs) and a reflector that can be mounted to the lighting strip comprising multi-faceted side walls extending away from the light strip. Each of the light emitting diodes desirably has a diode base and a light emitting portion. The multi-faceted side walls of the reflector cause light produced by the plurality of light emitting diodes (LEDs) to be amplified and formed into a uniform beam.

The lighting strip may also include an electrical connector that allows the lighting strip to be operatively connected to a power supply, such as through driver circuitry and control circuitry. The reflector may be constructed from silver-coated aluminum with a protective polymer coating. The plurality of light emitting diodes (LEDs) may be arranged in a linear row.

The side walls of the reflector may be configured to extend away from a base member that defines a plurality of openings receiving at least the light emitting portion of the plurality of light emitting diodes (LEDs), respectively. The side walls may be formed integral with the base member. The multi-faceted side walls may comprise multi-angle side walls. As an example, the side walls may include a first portion defining a first angle with the light emitting portion of the plurality of light emitting diodes (LEDs) and a second portion defining a second angle with the first portion. The first angle and second angle may be different angles.

Alternatively, the side walls of the reflector may extend away from a base member and may be symmetrical about an axis of symmetry that runs through a center of the base member. In addition, the side walls may extend away from a base member and each have a plurality of angles formed therein. The side walls may each comprise a first portion defining a first angle with the base member and a second portion defining a second angle with the first portion. The first angle and second angle may be different angles. The multi-faceted side walls may include multi-angle side walls.

Another embodiment is directed to a light emitting diode (LED) lighting fixture. The lighting fixture includes a base plate having a front side and a rear side. A plurality of lighting strips is mounted on the front side of the base plate. A reflector is mounted to each of the lighting strips and comprises multi-faceted side walls extending away from the light strip. The lighting strips are interconnected with a power supply through driver circuitry and control circuitry. For example, the power supply may be mounted to the rear side of the base plate within an enclosure, and may be connected to control circuitry, which is connected to driver circuitry, which is electrically coupled to the plurality of light emitting diodes (LEDs). Each of the lighting strips includes a plurality of light emitting diodes (LEDs), and each of the light emitting diodes desirably has a diode base and a light emitting portion. The multi-faceted side walls cause light produced by the plurality of light emitting diodes (LEDs) to be amplified and formed into a uniform beam. The plurality of light emitting diodes (LEDs) in each of the lighting strips may be arranged in a linear row.

The reflector may be constructed from silver-coated aluminum with a protective polymer coating. The side walls may be configured to extend away from a base member defining a plurality of openings receiving at least the light emitting portion of the plurality of light emitting diodes (LEDs), respectively. The side walls may include a first portion defining a first angle with the light emitting portion of the plurality of LEDs and a second portion defining a second angle with the first portion. The first angle and second angle may be different angles.

Alternatively, the side walls may extend away from a base member and may be symmetrical about an axis of symmetry that runs through a center of the base member. The side walls may extend away from the base member and each have a plurality of angles formed therein. The side walls may each comprise a first portion defining a first angle with the base member and a second portion defining a second angle with the first portion. The first angle and second angle may be different angles, and the multi-faceted side walls may be multi-angle side walls.

The lighting strips are connected to the base plate so as to permit at least conductive heat transfer from the lighting strips to the base plate. Heat transfer fins may be provided on at least one side of the base plate to conduct heat to the ambient environment. The base plate may be formed of anodized aluminum comprising an enhanced conductive non-uniform heat-transferring surface texture. The lighting strips may be connected to the base plate such that inter-contacting surfaces between the lighting strips and base plate are separated by less than ten hundredth of an inch (0.01 inches). Desirably, the inter-contacting surfaces between the lighting strips and base plate may be separated by less than about one thousandth of an inch (0.001 inches). The lighting strips may be mounted to mounting stages upstanding from the base plate.

In addition, a method of manufacturing a light emitting diode (LED) lighting arrangement for a lighting fixture is disclosed and detailed herein. The method generally includes the steps of providing a lighting strip having a plurality of light emitting diodes (LEDs), each desirably comprising a diode base and a light emitting portion; providing a reflector blank; forming a plurality of linearly arranged openings in the base member; bending the reflector blank to form a base member and multi-faceted side walls extending away from the base member to form a reflector; and associating the lighting strip with the reflector such that the plurality of openings respectively receive at least the light emitting portion of the plurality of light emitting diodes (LEDs).

The reflector blank may be manufactured from silver-coated aluminum with a protective polymer coating. The multi-faceted side walls may be formed as multi-angle side walls.

The side walls may be formed to have a first portion defining a first angle with the light emitting portion of the plurality of LEDs and a second portion defining a second angle with the first portion. The first angle and second angle may be different angles. Alternatively, the side walls may be formed to be symmetrical about an axis of symmetry that runs through a center of the base member.

The foregoing and other features and characteristics, as well as the methods of operation and functions of the related elements of structures and the combination of parts and economies of manufacture will become more apparent upon consideration of the following description with reference to the accompanying drawings, all of which form a part of this specification, wherein like reference numerals designate corresponding parts in the various figures.

BRIEF DESCRIPTION OF THE DRAWINGS

FIG. 2 is a rear view of the lighting fixture of FIG. 1.

FIG. 3 is a transverse cross-sectional view of the lighting fixture of FIG. 1.

FIG. 10A is a top view of a light emitting diode (LED) lighting strip for use in the lighting fixture of FIGS. 4A-4B.

FIG. 11A is a top view of another embodiment of a light emitting diode (LED) lighting strip for use in the lighting fixture of FIGS. 4A-4B.

FIG. 11B is a cross-sectional view of the light emitting diode (LED) lighting strip of FIG. 11A taken along line 11B-11B in FIG. 11A.

FIGS. 13A-13D are schematic diagrams of an exemplary computer circuit for use with the lighting fixture of FIGS. 4A-4B.

FIG. 23 is a rear view of the office lighting fixture of FIG. 22.

FIG. 24 is a side view of the office lighting fixture of FIG. 22.

DETAILED DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific devices, features, and components illustrated in the accompanying drawing figures and described herein are simply exemplary and should not be considered as limiting.

Generally speaking, an embodiment of the present invention involves a lighting arrangement incorporating one or more lighting strips comprising a plurality of light emitting diodes LEDs to provide a light emitting sub-assembly or device. A lighting fixture may be provided that incorporates the LED lighting strips and desirably utilizes a shell or housing assembly of the lighting fixture as an integrated heat transfer device, often described herein as a thermal radiator, thereby effectively dissipating any heat created by the LEDs so as to prevent heat buildup within the lighting fixture and, thereby, permitting the LEDs to operate more efficiently for a longer life span. Additional embodiments are directed to amplifying reflectors that may be associated with the lighting strips so that light produced by the plurality of light emitting diodes (LEDs) may be amplified and formed into a uniform beam which may be a focused beam useful, for example, as a spotlight, or a diffused beam useful, for example, as an overhead streetlight or possibly as an overhead office light. The combination of reflectors for amplifying or intensifying the light and the heat dissipation provided through the thermal radiation properties of the housing provides for a lighting fixture adapted to provide effective light output for use as a street light, while not overheating and reducing the life span or safety of the street light.

Figure 1:
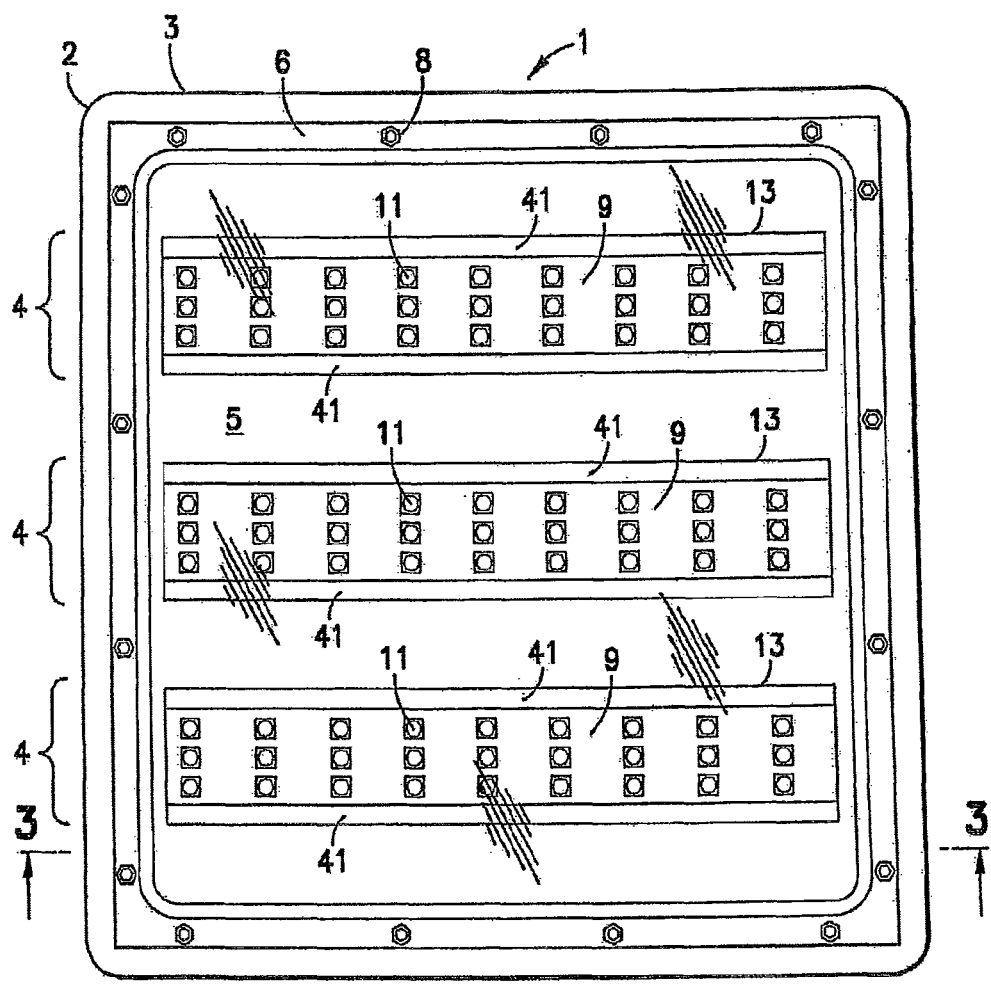
FIG. 1 is a front view of a first embodiment of a lighting fixture for exemplary use as a streetlight.
Figure 4A:
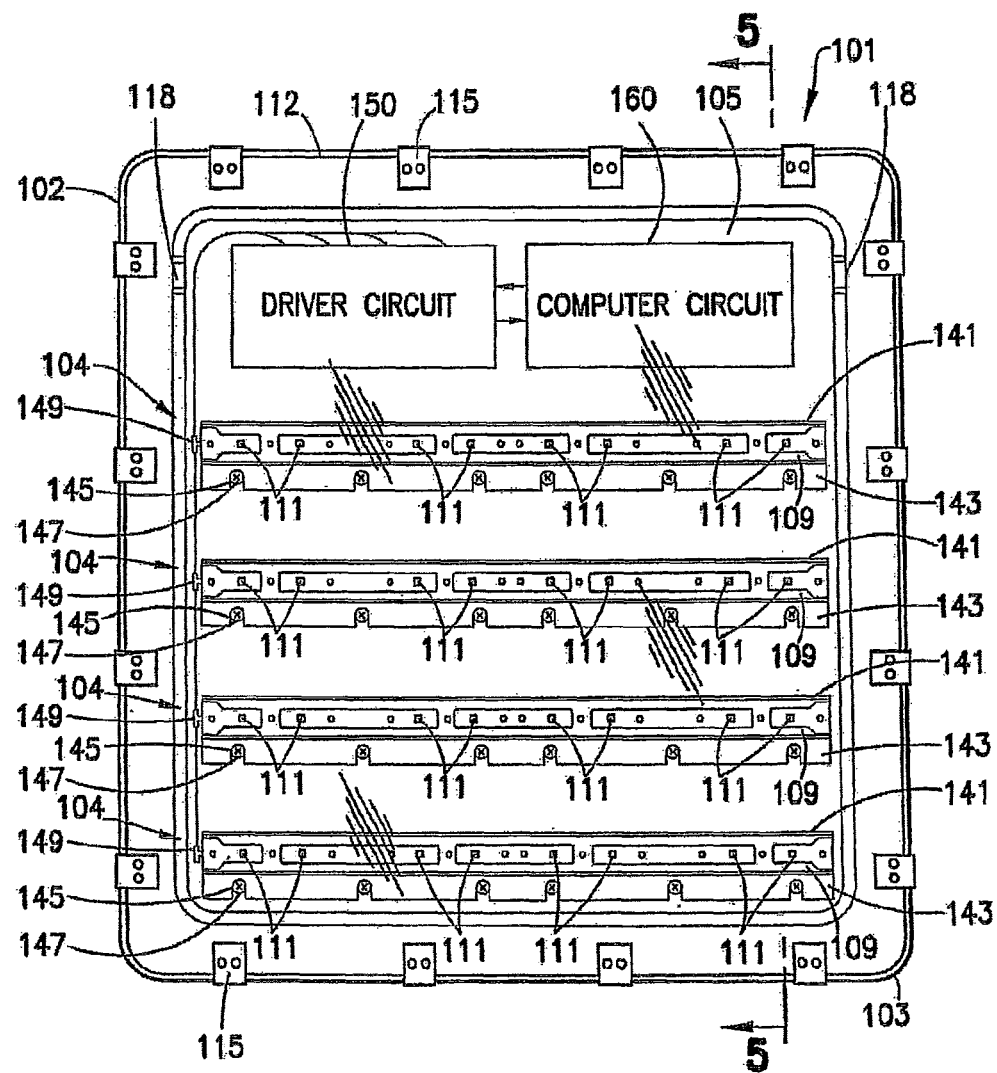
FIG. 4A is a front view of a second embodiment of a lighting fixture for exemplary use as a streetlight.
Figure 4B:
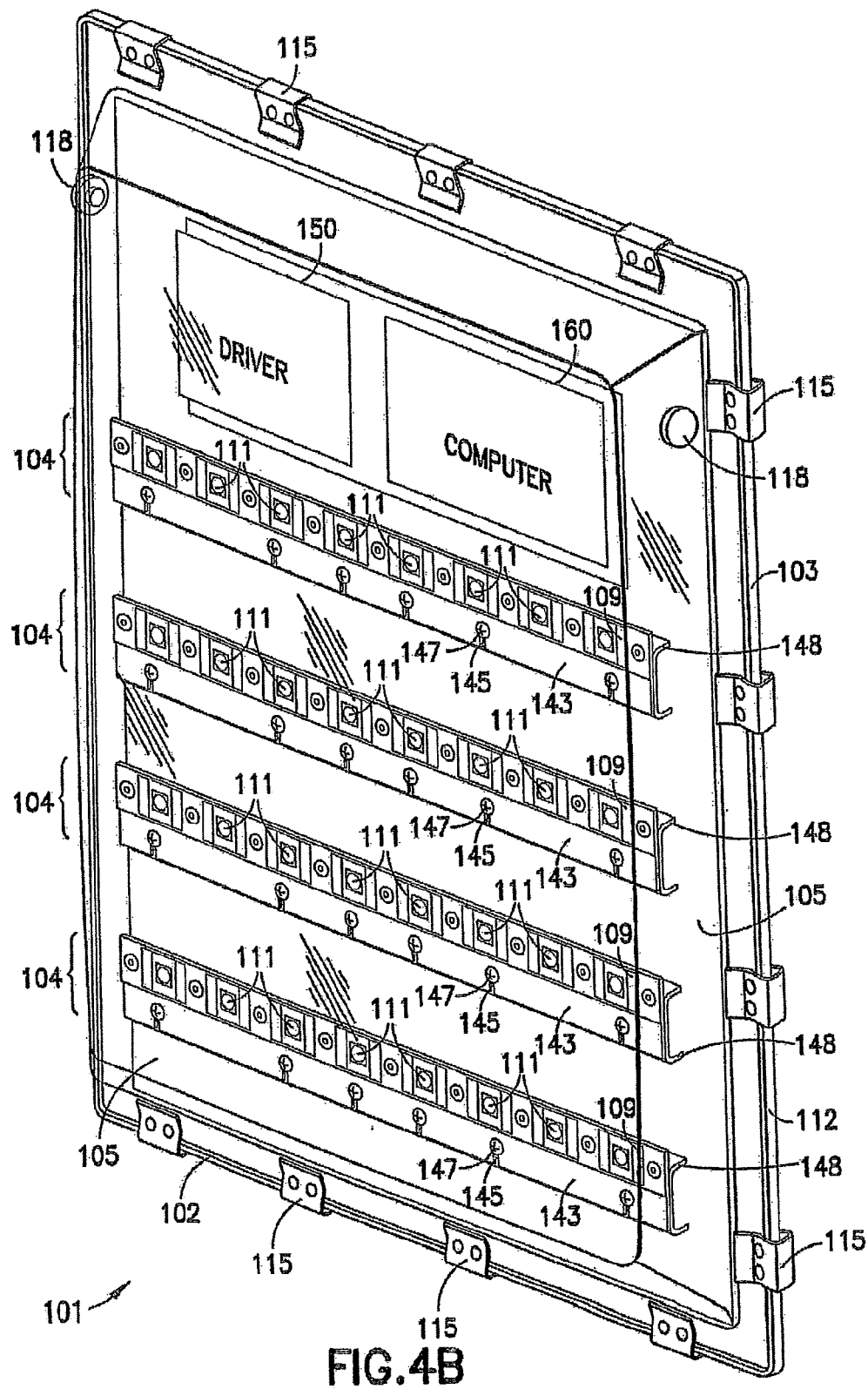
FIG. 4B is a front perspective view of the second embodiment of a lighting fixture for exemplary use as a streetlight shown in FIG. 4A.

With reference generally to FIGS. 1-3, features of the invention are described herein with reference to a lighting fixture 1 in accordance with one embodiment of the invention. In the following example, lighting fixture 1 is described in the context of an overhead streetlight for exemplary purposes. Lighting fixture 1 generally includes a housing 2 comprising a base plate 3 having a front side 5 and a rear side 7. Base plate 3 includes at least one and, preferably, a plurality of light emitting sub-assemblies 4, also referred to herein as a lighting arrangement, particularly an LED lighting arrangement. Each light emitting sub-assembly 4 is comprised of a lighting strip 9, each including one or more surface-mounted LEDs 11 mounted thereto, and each light emitting sub-assembly may further include a reflector 13 mounted in a manner extending away from the lighting strip 9, as will be described in more detail herein.

In the embodiment depicted in FIGS. 1-3, three lighting strips 9 are mounted to front side 5 of base plate 3. Lighting strips 9 may be mounted directly on front side 5 of base plate 3, or may be mounted to a separate u-shaped channel or mounting stage that is directly mounted to base plate 3, as described in more detail in connection with the embodiment of FIGS. 4-7. Each lighting strip 9 includes a plurality of surface-mount LEDs 11 mounted thereto, and may be constructed from any suitable material for mounting LEDs and associated circuitry, and is desirably constructed from aluminum Base plate 3 and the base of lighting strip 9 may be constructed from any suitable material adapted for radiating and transferring thermal energy. Desirably, base plate 3 and lighting strip 9 are constructed of aluminum or an aluminum alloy, such as aluminum alloy 1100 or aluminum alloy 3003 and, in particular, aluminum alloys subjected to an anodizing treatment. Lighting strip 9 may have an exemplary overall thickness of about ⅛ inch thick, and base plate 3 may have an exemplary thickness about ⅛ to ¼ inch thick. Base plate 3 may also be formed in a representative iconic shape, such as a football, baseball glove, hockey stick, and the like to provide a decorative beam of light.

LEDs 11 are desirably high-power LEDs such as the LUXEON® REBEL manufactured by Phillips Lumileds Lighting Company or the CREE® XLAMP® XR-E LED manufactured by Cree, Inc. Alternatively, plasma emitter bulbs may be used instead of LEDs 11. Plasma emitter bulbs are typically the size of a dime. Each bulb is filled with a gas and metal halide materials. In operation, an electric field is applied to the bulb, which ionizes the gas molecules to create a gas plasma. The metal halides then completely join the gas plasma which emits a powerful white light. Such plasma emitter bulbs are currently manufactured by Luxim® Corporation.

Desirably, lighting fixture 1 also includes a transparent cover 6 coupled to front side 5 of base plate 3. Cover 6 may be constructed of any suitable transparent material for passing light emitted by LEDs 11 therethrough, and is desirably selected from a polymeric material such as acrylic, ballistic acrylic, thermoplastic, polycarbonate, and the like. One particularly suitable material is LEXAN. The material forming cover 6 is desirably shatterproof and otherwise weatherproof so as to prevent damage when exposed to the exterior environment.

Transparent cover 6 may be coupled to base plate 3 using any suitable fastening mechanism, such as using bolts 8, so long as a generally airtight seal is maintained about the perimeter of housing 2, thereby maintaining the interior portion of lighting fixture 1 as a sealed internal environment. In the illustrated exemplary embodiment of FIGS. 1-3, a mounting bracket in the form of mounting member 10 is coupled to rear side 7 of base plate 3 for mounting of lighting fixture 1 to an appropriate surface. Mounting member 10 may comprise any general form for mounting to a particular surface, such as a plurality of mounting holes 12 for receiving a fastening member (not shown) which allows the lighting fixture 1 to be adjustably mounted to a pole. In the illustrated exemplary embodiment, lighting fixture 1 is configured to be mounted at a height sufficient to provide adequate lighting to a street or surface below. For instance, if lighting fixture 1 is mounted on a pole at a height of 30 feet above a street, lighting fixture 1 provides a lighting pattern that extends about 50 feet from the base of the pole and about 65 feet on either side of the pole.

Each sub-assembly 4 further includes a reflector 13 mounted so as to extend from the front side 5 of base plate 3 such that side walls 41 of reflector 13 extend at an angle from each of lighting strips 9. Each reflector 13 desirably includes a base portion (discussed in more detail herein) with a pair of side walls 41 extending from opposite sides thereof at an angle. Desirably, side walls 41 are integral with the base portion of reflector 13. Reflector 13 may be constructed of any reflective material, and may include a protective polymer coating thereon. Desirably, the material forming each reflector 13 has a reflectivity that is on the order of 95% to 98% reflective. Additionally, the polymer coating prevents corrosion on reflector 13. An exemplary reflective material is silver-coated aluminum, which is not to be construed as limiting, and any highly-reflective material may be used to construct the reflector assemblies.

With specific reference to FIGS. 2 and 3, lighting fixture 1 further includes a power supply and control circuitry (not shown) positioned within a rear housing 17 mounted on rear side 7 of base plate 3. The power supply and control circuitry are electrically coupled to the plurality of LEDs 11 to provide effective lighting control, as described in more detail with respect to the embodiment of FIGS. 4-7. Housing 17 may also include a window 19 with a light detector in the form of a photoelectric eye 21 positioned thereunder. In order to efficiently transfer light from window 19 to photoelectric eye 21, an acrylic rod or fiber optic array (not shown) may be positioned between window 19 and photoelectric eye 21. In the present non-limiting embodiment, photoelectric eye 21 provides electronic signal(s) to the control circuitry which causes LEDs 11 to turn on when surrounding ambient light has dropped below a predetermined level as will be described hereinafter.

An LED light (not shown) may also be mounted on rear side 7 of base plate 3 and be coupled to the power supply and control circuitry for when, for example, utility workers are working on the pole where light fixture 1 is mounted. Such a separate, rear-mounted LED provides utility workers with appropriate lighting above lighting fixture 1. This additional LED light may be turned on manually through the use of a magnetic switch, by an infrared sensor or by an ultrasonic sensor, as examples.

With reference to FIGS. 4-7, an alternative embodiment of a lighting fixture 101 is illustrated. Lighting fixture 101 generally includes a housing 102 defined by a base plate 103 having a front side 105 forming a generally interior housing surface and a rear side 107 forming a generally outer housing surface for the lighting fixture. Lighting fixture 101 includes at least one and, preferably, a plurality of light emitting sub-assemblies 104, again also referred to herein as a lighting arrangement, particularly an LED lighting arrangement. Each light emitting sub-assembly 104 includes a lighting strip 109 comprised of one or more surface-mounted LEDs 111 mounted to a circuit board substrate or base member 142 and each light emitting sub-assembly 104 may further include a reflector 141 mounted in a manner extending away from the lighting strip 109, as will be described in more detail herein. Each lighting strip 109 is mounted either directly or indirectly to base plate 103 in a manner permitting effective and efficient heat transfer between the LEDs 111 mounted to base member 142 and base plate 103, as will be described in further detail herein. It is desirable for the LEDs 111 to be mounted in a linear row or arrangement so that reflector 141 may effectively reflect light emitted by the LEDs 111, amplify this light and direct the light in a manner effective for the intended purpose of the lighting fixture 101, for example, as use as streetlight in the instant example or for other applications such as a spotlight, office overhead light, and other applications. The reflector 141 may be configured to reflect and amplify the light from the LEDs 111 to achieve the light characteristics that are desired for the lighting fixture 101.

While it is noted that the number of lighting strips 109 may be dependent upon the intended use of the lighting fixture, the embodiment of FIGS. 4-7 includes four lighting strips 109, shown to be effective in the intended use of the present lighting fixture as a streetlight. Moreover, each lighting strip 109 includes a plurality of linearly-arranged, surface-mount LEDs 111 mounted to base member 142. Base member 142 is desirably constructed, at least in part, of a similar material as base plate 103, such as aluminum or aluminum alloy, preferably an anodized aluminum alloy. In the illustrated embodiment, each lighting strip 109 includes eight linearly-arranged LEDs 111 mounted to base member 142. However, this is not to be construed as limiting, as any suitable number of LEDs 111 may be mounted to each lighting strip 109. As with the previous embodiment, LEDs 111 are desirably high-power LEDs such as the LUXEON® REBEL manufactured by Phillips Lumileds Lighting Company or the CREE® XLAMP® XR-E LED manufactured by Cree, Inc. Alternatively, plasma emitter bulbs may be used instead of LEDs 111. Such plasma emitter bulbs are currently manufactured by Luxim® Corporation, as noted previously.

Base plate 103 along with transparent cover 106 essentially forms the complete housing 102 of lighting fixture 101. Base plate 103 is typically constructed of a suitable material to structurally support lighting fixture 101 and to provide effective protection for the components and circuitry within lighting fixture 101. Moreover, base plate 103 serves at least another purpose in that it also acts as a material for effectively and efficiently transferring thermal energy from LEDs 111 to dissipate heat therefrom, as will be further detailed herein. Briefly, it is envisioned that the interaction of base plate 103 and base member 142 effectively and efficiently conducts heat away from LEDs 111 and base plate 103 is desirably adapted to transfer the heat energy to the ambient environment using any one or more of conductive, convective, and radiation heat transfer modes to the ambient environment. To achieve effective and efficient heat transfer, base plate 103 may be constructed from any structurally supportive material that is adapted for transferring thermal energy. Base plate 103 is desirably constructed of aluminum or an aluminum alloy, such as aluminum alloy 1100 or aluminum alloy 3003 and, in particular, aluminum alloys subjected to an anodizing treatment. Base plate 103 may have an exemplary thickness about ⅛ to ¼ inch thick. By anodizing the aluminum used to construct base plate 103, the base plate 103 is provided with a heat-transferring surface texture, typically a non-uniform or non-smooth, somewhat roughened surface texture that increases the ability of the base plate 103 to transfer heat energy to the ambient environment and, accordingly, the anodizing process enhances the heat dissipating properties of base plate 103, thereby allowing it to function as a particularly effective and efficient heat transfer device or mechanism, also termed herein as a "thermal radiator". Moreover, base plate 103 may further include a plurality of thermal radiating fins 114 on rear side 107 to provide additional surface area for convective heat transfer and dissipation to the ambient environment, such that the LEDs 111 stay cool regardless of the outdoor temperature. Additionally, base plate 103 has an outer peripheral edge 112 that is curved away from a body of the base plate 103 at an angle of approximately 90°.

Desirably, lighting fixture 101 includes a transparent cover 106. Transparent cover 106 may be manufactured from any suitable material such as, but not limited to, a polymeric material, such as acrylic, ballistic acrylic, thermoplastic, polycarbonate, and the like. Cover 106 is coupled with base plate 103 using any suitable mechanical fastening arrangement, so long as a generally airtight seal is maintained about the perimeter of housing 102, thereby maintaining the interior portion of lighting fixture 101 as a sealed interior environment.

Figure 5:
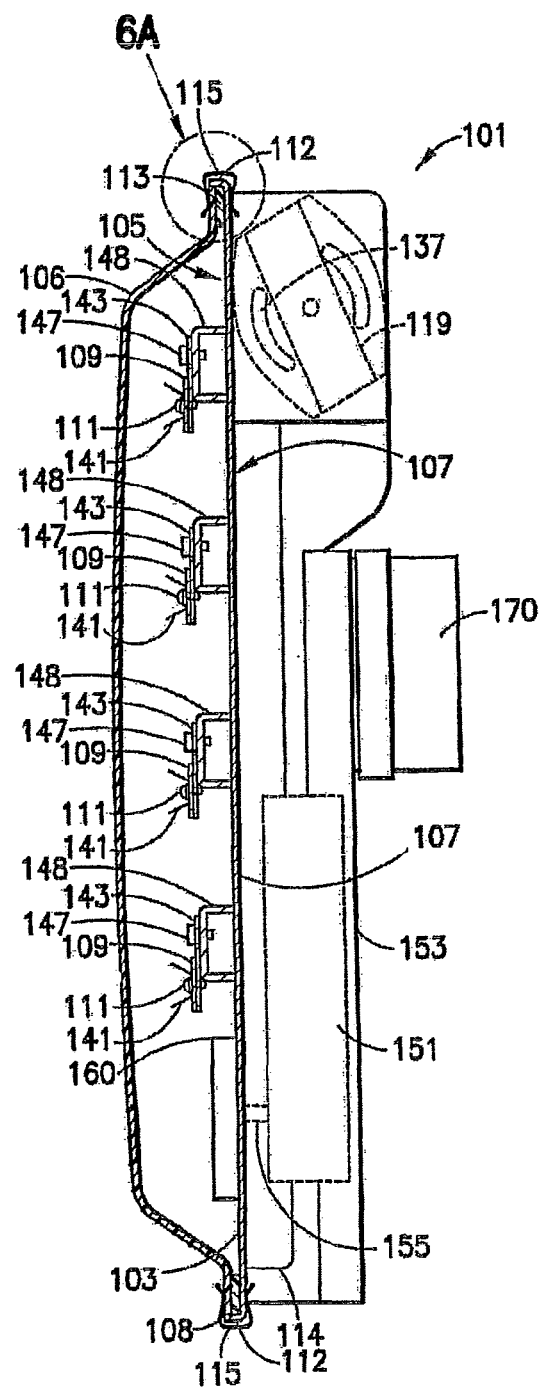
FIG. 5 is a cross-sectional view of the lighting fixture of FIGS. 4A-4B taken along line 5-5 in FIG. 4A.
Figure 6A:
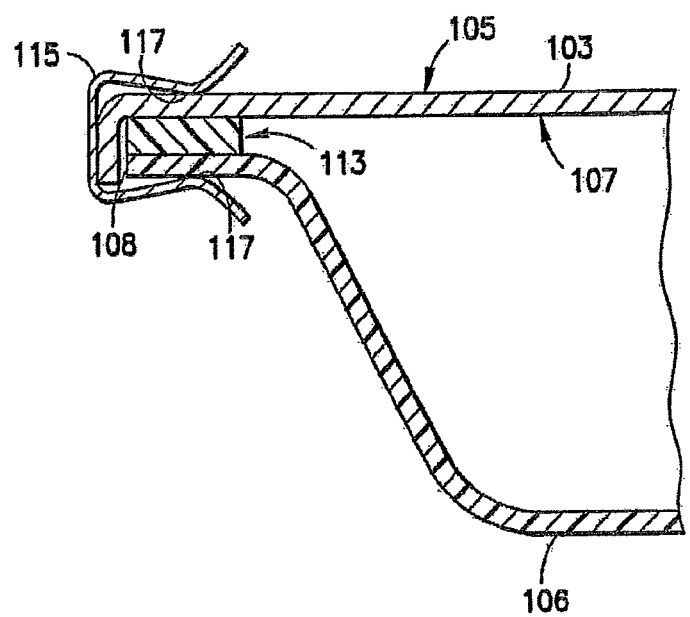
FIG. 6A is a portion of the cross-sectional view of FIG. 5 enlarged for viewing.
Figure 6B:
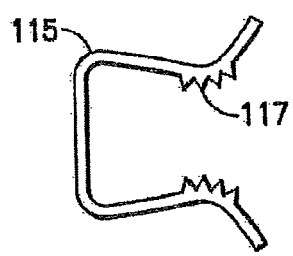
FIG. 6B is an enlarged view of a mounting clip in one embodiment.
Figure 7A:
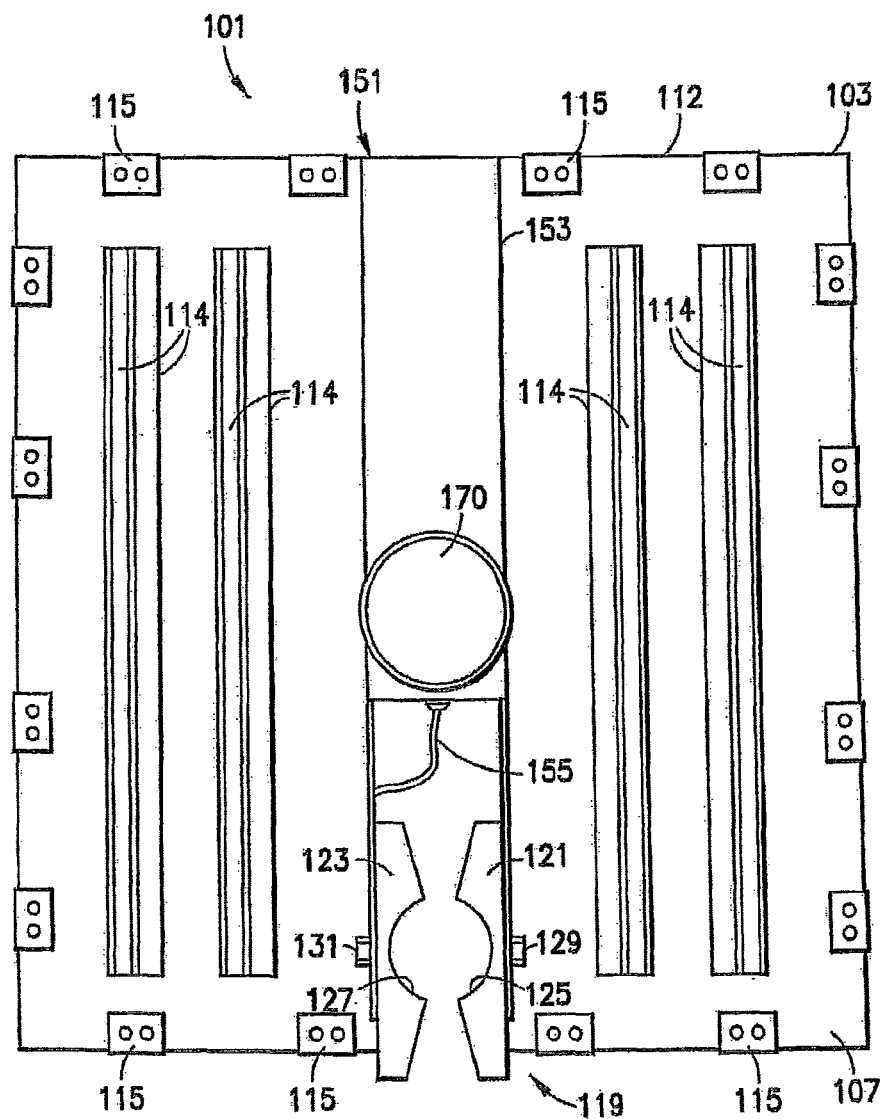
FIG. 7A is a rear view of the lighting fixture of FIGS. 4A-4B.
Figure 7B:
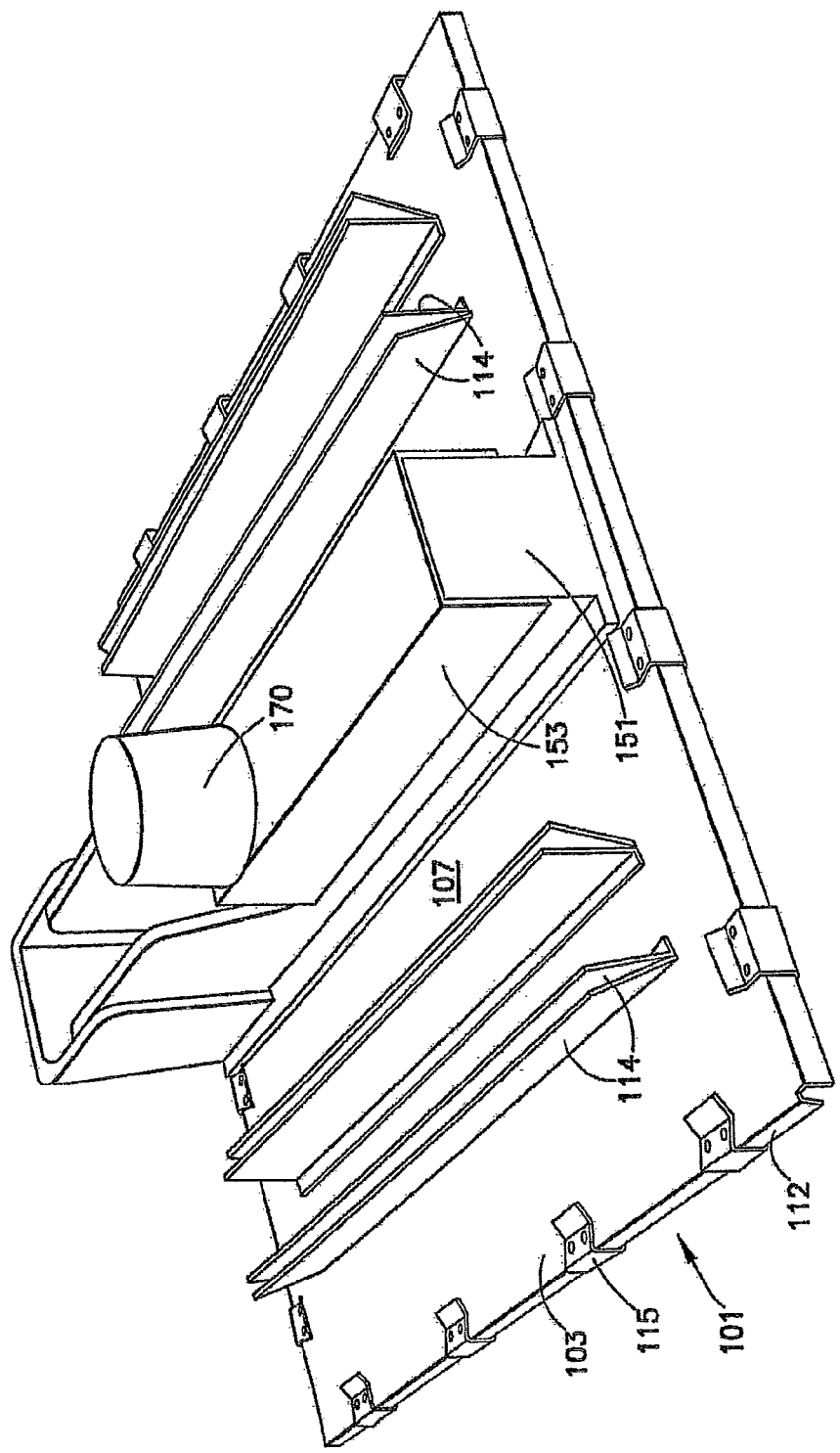
FIG. 7B is a rear perspective view of the lighting fixture of FIGS. 4A-4B.

With specific reference to FIGS. 6A-6B, and with continuing reference to FIGS. 4A-4B, 5 and 7A-7B, transparent cover 106 may be fitted such that an outer edge 108 is positioned adjacent to outer peripheral edge 112 of base plate 103. Desirably, a gasket 113 is positioned between outer edge 108 of transparent cover 106 and outer peripheral edge 112 of base plate 103 to provide a generally fluid-tight seal therebetween. Transparent cover 106 may also include at least one protective vent 118. Protective vent 118 provides an effective barrier against harsh weather conditions (e.g., rain, snow, high winds), while allowing water vapor to exit effectively from within transparent cover 106, thereby reducing the likelihood of condensation accumulating beneath transparent cover 106. Protective vent 118 equalizes pressure between the transparent cover and the ambient environment and is desirably able to vent moisture that becomes trapped within the interior enclosure of housing 102 generally defined by transparent cover 106 and base plate 103, while allowing only dry air to enter into the enclosure created by transparent cover 106. An example of such a protective vent 118 is the GORE™ Protective Vent manufactured by W. L. Gore & Associates, Inc.

Once transparent cover 106 is fitted to base plate 103, a suitable clamp arrangement, such as a plurality of spring clips 115, is positioned over outer edge 108 of transparent cover 106 and outer peripheral edge 111 of base plate 103 to fixedly hold transparent cover 106 to base plate 103. Spring clips 115 are desirably formed with securing structure 117, such as teeth, positioned on an inner surface thereof. Spring clips 115 are desirably adapted to allow for transparent cover 106 to be quickly and easily removed. For example, a special tool may be provided for use with spring clips 115 to open and remove spring clips 115 from association with transparent cover 106 and base plate 103. It is desirable that, if this specialized tool is not used, securing structure 117 on spring clips 115 will scratch and otherwise damage transparent cover 106 when removal of spring clip 115 is attempted. This visible damage to transparent cover 106 can provide clear evidence to an authorized repair technician that someone has tampered with lighting fixture 101.

Figure 8:
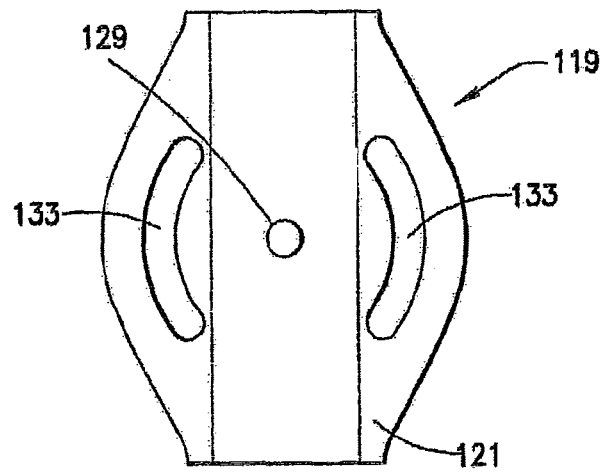
FIG. 8 is a side view of a pole mounting assembly for use with the lighting fixture of FIGS. 4A-4B.
Figure 9:
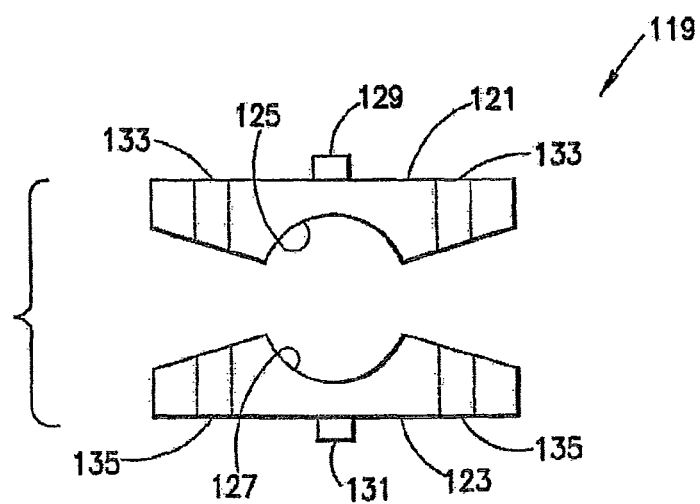
FIG. 9 is an exploded top view of the pole mounting assembly of FIG. 8.

With reference to FIGS. 8 and 9 and with continuing reference to FIGS. 4-7, a further embodiment of a mounting bracket in the form of pole mounting member 119 is coupled to rear side 107 of base plate 103. Pole mounting member 119 includes a first clamp member 121 and a second clamp member 123. First clamp member defines a first arcuate surface 125 and second clamp member defines a second, opposing arcuate surface 127. First arcuate surface 125 and second arcuate surface 127 are configured to face one another and capture a pole (not shown) therebetween. Once the pole is captured between first clamp member 121 and second clamp member 123, a first bolt 129 and a second bolt 131 may be inserted and tightened thereby securing the pole between first clamp member 121 and second clamp member 123. First clamp member 121 and second clamp member 123 desirably each have an inside surface having a waffle pattern thereon. This waffle-pattern grips the pole when it is positioned between first clamp member 121 and second clamp member 123 thereby preventing rotation of the lighting fixture 101 relative to the pole. First clamp member 121 and second clamp member 123 each also define a pair of arcuate slots 133, 135. Arcuate slots 133, 135 are configured to receive respective bars 137. Mounting bars 137 are designed to move within arcuate slots 133, 135 to allow lighting fixture 101 to be angularly adjusted for use in directing light output from lighting fixture 101. In a typical mounting scenario, lighting fixture 101 is mounted to an extension pole extending from an upstanding pole (such as a telephone-style pole) and it is desired that lighting fixture 101 be positioned with the transparent cover 106 thereof facing downward and generally parallel to the ground surface, thereby directing light output directly downwardly. The arrangement of mounting bars 137 and arcuate slots 133, 135 provide lighting fixture to be mounted in such a manner regardless of the angle that the extension pole extends from the upstanding pole, as will be appreciated by those skilled in the art. It is also contemplated that alternative mounting clamps may be utilized with the present lighting fixture, depending upon the particular installation application.

With reference to FIGS. 10 and 11, and with continuing reference to FIGS. 4-7, lighting fixture 101 includes a plurality of light emitting sub-assemblies 104 including LED lighting strips 109 on front side 105 of base plate 103. Each lighting strip 109 includes a plurality of surface-mount LEDs 111 mounted onto circuit board or base member 142 in electrical contact/connection therewith and a reflector 141 mounted thereto. In the present embodiment, reflector 141 defines multiple facets formed therein that amplify the light provided by LEDs 111 as will be discussed in greater detail hereinafter. Such facts may be angled formations in the body of the reflector 141 but reflector 141 is not intended to be limited to such facets. Facets should be read broadly in connection with this disclosure as a formation(s) in the body of reflector 141 that amplify the light output of the LEDs 111 and direct the amplified and desirably uniform light outward from the light fixture 101 for any desirable application. This sets forth certain exemplary and non-limiting applications for light fixture 101 such as street-lighting or office overhead lighting, as mentioned previously. It is noted that in FIG. 4B, reflectors 141 are omitted for clarity purposes.

The incorporation of LEDs into conventional lighting fixtures can be problematic due to excessive heat build-up within the lighting fixture, which can deleteriously affect performance and lifespan of the LEDs. Lighting fixtures 1, 101 in accordance with this disclosure exhibit effective and efficient dissipation of the heat generated by LEDs 11, 111. In particular, this heat dissipation is accomplished utilizing the entire housing of the lighting fixture 1, 101 as a heat transfer device which effectively transfers heat energy generated LEDs 1, 111 to the external environment. In the foregoing, it was noted that base plate 103 may be formed of specific materials having suitable heat transfer characteristics and this material may be anodized and coated to provide a surface texture on the base plate 103 having enhanced heat transferring properties. Heat-transfer fins 114 are also provided on base plate 103 for improving heat transferring attributes of base plate 103. A further aspect of the heat transferring ability of light fixture 101 in particular is the arrangement of LEDs 111 with circuit board base member 142 and the mounting of the base member 142 to the base plate 103. As described next herein, this arrangement enhances the heat transfer from LEDs 111 to base plate 103.

Figure 10B:
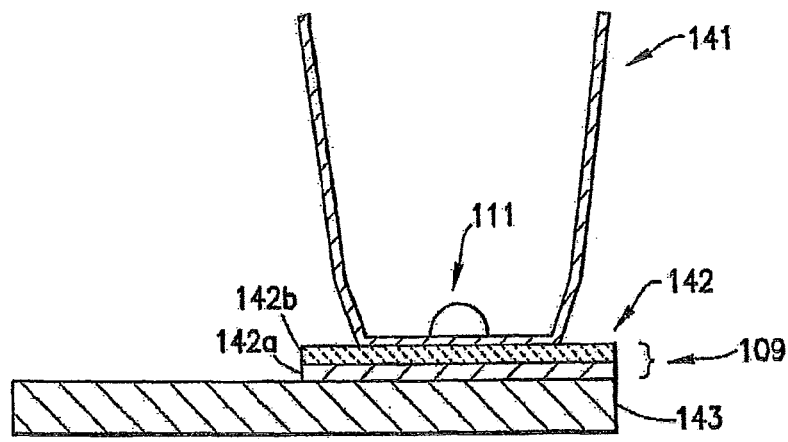
FIG. 10B is a cross-sectional view of the light emitting diode (LED) lighting strip of FIG. 10A taken along line 10B-10B in FIG. 10A.
Figure 10C:
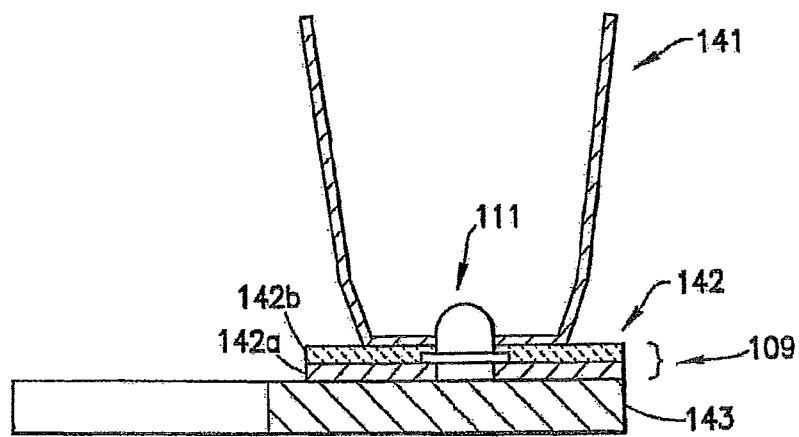
FIG. 10C is a cross-sectional view of the light emitting diode (LED) lighting strip of FIG. 10A taken along line 10C-10C in FIG. 10A.

More particularly, as noted previously, each lighting strip 109 includes a singular line of LEDs 111 mounted onto base member 142. Base member 142 is desirably constructed of the same material as base plate 103. As shown in FIGS. 10A-10C, base member 142 represents a circuit substrate for LEDs 111, including a metallic base supporting substrate layer 142a, such as anodized aluminum oxide, with a non-conductive layer 142b on a surface thereof, such as a ceramic layer or enamel layer. Electronic circuitry is then printed onto the non-conductive layer 142b, with a second non-conductive layer positioned over the circuitry. Such a configuration is generally known in the semi-conductor art and the illustration of metallic base supporting substrate layer 142a and non-conductive layer 142b is for explanatory purposes only. If desired, a fiberglass layer may also be provided between the circuitry and the second non-conductive layer. The LEDs 111 are mounted to the surface of base member 142 in electrical contact with the circuitry therein, thereby Banning each lighting strip 109.

Reflector 141 is further mounted on the surface of base member 142, with LEDs 111 extending through openings 144 through the base portion of reflector 141. In particular, each reflector 141 comprises opposed side walls defining facets, as mentioned previously; various embodiments of reflector 141 are described herein but each such embodiment is generally in the form of an elongated channel structure having a base portion or member and side walls defining said facets. The base portion or member is desirably positioned flush with the top surface of base member 142 of lighting strip 109 and is mounted thereon using suitable fastening means, such as an adhesive, bolts, rivets, and the like. As noted, reflector 141 defines openings 144 through the base portion such that when reflector 141 is mounted to base member 142, light from LEDs 111 can reflect off the interior surfaces of the side walls of the reflector 141, as will be described in greater detail with reference to the reflector embodiments depicted in FIGS. 16-21. Each lighting strip 109 with reflector 141 mounted thereto thereby forms each light emitting sub-assembly 104. Each lighting strip 109 also includes an electrical connector 149 that allows the lighting strip 109 of the light emitting sub-assembly 104 to be operatively connected to a driver circuit 150. As will be discussed in greater detail hereinafter, driver circuit 150 divides the power output from a power supply 151 equally among the plurality of lighting strips 109, such as four lighting strips 109 in the instant embodiment, with little to no variation in amperage between the respective lighting strips 109. This division is effective in extending the lifespan of LEDs 111.

Returning to the heat transfer attributes of lighting fixture 101, base plate 103 of entire housing 102 forms a mechanism for dissipating thermal energy to the ambient environment, essentially creating a heat transfer mechanism for dissipating heat generated by the LEDs 111 in each lighting strip 109. An aspect of the mounting of LEDs 111 on lighting strip 109 is that there is significant physical contact between the bottom surface of lighting strip 109 and base plate 103 which provides robust heat transfer between the lighting strip 109 and base plate 103 and heat produced the LEDs 111 on the lighting strip 109 is effectively conducted to base plate 103 for transfer to the ambient environment. Accordingly, in summary, the housing 102 of lighting fixture 101 acts as a thermal radiating mechanism or device in accordance with this disclosure. To further explain the foregoing, direct physical contact between the portion of lighting strip 109 and base plate 103 generally comprises base member 142 being in significant surface area contact with base plate 103 such that any gap between the inter-contacting surfaces is less than one hundredth of an inch (0.01 inches), and preferably less than about one thousandth of an inch (0.001 inches). This inter-contacting surface engagement is effective in achieving the desired heat transfer from the respective lighting strips 109 to base plate 103. Accordingly, this disclosure contemplates the foregoing-described engagement of each lighting strip 109 with base plate 103 to achieve the desired cooling of LEDs 111. As noted, base member 142 for each lighting strip 109 may be mounted directly to base plate 103 or indirectly to base plate 103 by some intervening structure. Any such intervening structure is desirably connected to base plate 103 so as not to inhibit substantially the heat transfer between base member 142 and base plate 103 of housing 102.

In order to secure and maintain the substantial surface area contact between each lighting strip 109 and base plate 103 for each of the light emitting sub-assemblies 104, conventional fastening methods may be used to mount the respective lighting strips 109 to the front side 105 of base plate 103. Such conventional fastening methods include, for example, using mechanical fasteners such as screws, bolts or rivets, conductive adhesives, welding, or other known attachment means. In certain embodiments, portions of light emitting sub-assembly 104 may be interconnected using mechanical fasteners that extend below the bottom surface of the sub-assembly 104, such that the bottom surface of the thus-prepared light emitting sub-assembly 104 includes a discontinuous surface. For example, reflector 141 may be attached to lighting strip 109 through a rivet, which extends through respective holes in base member 142 of lighting strip 109 below the bottom thereof creating a protrusion, thereby preventing the bottom surface of lighting strip 109 from providing a smooth surface for direct contact with a separate surface, such as base plate 103. In such embodiments, it is contemplated that a separate mounting bracket may be used to support the lighting strips 109 on base plate 103 so as to maintain effective contact for heat transfer, and such intervening structure should not inhibit heat transfer from the lighting strips 109 to the base plate 103 in accordance with this disclosure. For example, as depicted in FIGS. 4-5, lighting strips 109 may be mounted to a separate mounting stage 148, such as in the form of a u-shaped channel, which is directly mounted to base plate 103. In particular, base plate 103 may include a series of mounting stages 148 as a u-shaped channel that is unitarily formed with base plate 103 or otherwise connected thereto, such as through welding, for providing effective heat transfer therebetween. Mounting stages 148 desirably conduct heat energy effectively and efficiently from lighting strips 109 to the main body of base plate 103.

Moreover, each lighting strip 109 may further be mounted onto a separate mounting member 143. In particular, each light emitting sub-assembly 104 may further include a mounting member 143 acting as a support plate for mounting base member 142 of lighting strip 109 (including electrically connected LEDs 111) thereto. Mounting member 143 may be formed of any suitable material adapted for providing structural support to lighting strip 109, and is desirably formed of the same material as base member 142 of lighting strip 109, such as an anodized aluminum alloy, having the desirable heat transfer characteristics described previously. Mounting member 143 generally has the same thickness as base member 142, and is desirably of the same general length as base member 142 and desirably has a width greater than 1.5 times that of base member 142 and, more desirably, a width equal to or greater than two times that of base member 142. In this manner, any protrusion formed from a fastening member extending through base member 142 will be offset from the attachment between mounting member 143 and stage 148. Thus, light emitting sub-assembly 104 may be effectively attached to base plate 103 via stage 148 with substantially the entire bottom surface of lighting strip 109 contacting mounting member 143, and with mounting member 143 effectively contacting the entire upper surface of stage 148. Accordingly, stage 148 provides a mechanism for offset attachment of light emitting sub-assembly 104 so as to provide for sufficient contact between mounting member 143 and the upper surface of stage 148 for effect thermal transfer.

In addition, the general shape of stage 148 (shown as a general u-shape) can further provide a mechanism for additional surface area for heat transfer so as to further dissipate heat generated by LEDs 111 through mounting member 143. In such embodiments, mounting member 143 (including lighting strip 109 attached thereto) may be connected to stage 148 in any known manner. In one particular embodiment as shown in FIGS. 4 and 10A, mounting member 143 defines a plurality of spaced grooves 145 formed along one longitudinal end thereof. Each of the grooves 145 is configured to receive a fastening member 147 to mount lighting strip 109 to stage 148 and, thereby, to the front side 105 of base plate 103. By providing a plurality of grooves in a spaced manner, a plurality of fastening members can be used to mount lighting strip 109, thereby ensuring proper contact between the bottom surface area of mounting member 143 and stage 148 to provide effective heat transfer therebetween, which is effectively accomplished by limiting the gap between the bottom surface of mounting member 143 and the top surface of stage 148 to less than about 0.01 inches.

It will be appreciated from, for example, FIG. 5 that each of the lighting strips 109 is mounted to an individual stages 148 provided on the front side 105 of base plate 103. By mounting lighting strips 109 to such individual stages 148, the individual lighting strips 109 can easily be mounted or removed from base plate 103 expediting replacement of a defective and/or damaged lighting strip 109. Accordingly, in addition to providing effective heat transfer between LED lighting strips 109 to base plate 103, the foregoing mounting configuration allows for a quick and easy change of LED lighting strips 109, for example, if one of LED lighting strips 109 is damaged or defective. It is known that in conventional incandescent lighting fixtures, replacement of a worn out or defective lamp involves mere replacement of the bulb unit. LED lights, however, represent circuit chips that are electrically mounted onto a circuit board. Accordingly, replacement of a worn or defective LED chip involves replacement of the entire LED board. The attachment and mounting configuration contemplated through the various embodiments in this disclosure provides a mechanism for quick and easy replacement of one or more LED lighting strips 109, without requiring significant modification or rebuilding of the lighting fixture. Moreover, by providing multiple strips of LEDs in a single fixture, if one LED light or strip fails, the fixture will still be able to provide light output through the remaining functional lighting strips, albeit at a reduced level, until such time that the malfunctioning lighting strip or individual lighting assembly can be replaced.

In particular, in order to gain access to the interior of the lighting fixture, 101, transparent cover 106 is removed by removal of clamps 115. Fastening members 147 positioned in grooves 145 can then be loosened and removed using an appropriate tool. Next, the defective or damaged LED lighting strip 109 is removed from front side 105 of base plate 103. Then, electrical connector 149 is disconnected from driver circuit 150. Finally, a new LED lighting strip 109 is supplanted for the defective or damaged LED lighting strip 109. Transparent cover 106 is then reassembled to base plate 103.

In a variation shown in FIGS. 11A and 11B, lighting strips 109 may be configured to be mounted to stages 148 in a slightly different manner. Lighting strip 109 of FIGS. 11A-11B is identical to that disclosed in previous embodiments, with the exception that "keyhole" shaped openings 156 extend through the surface of lighting strip 109. Such keyhole openings 156 provide a mechanism for attachment of lighting strip 109 to base plate 103 of housing 102. In particular, in such an embodiment, mechanical fasteners, such as screws, may be inserted into keyhole openings 156 and extend through corresponding openings 158 in underlying mounting member 143 to engage a stage 148 on base plate 103. The mechanical engagement is desirably sufficient to enable effective and efficient heat transfer between the lighting strip 109 and base plate 103. The keyhole openings 156 allow lateral adjustment of lighting strip 109 relative to mounting member 143 to allow for proper attachment of a reflector 141 to the lighting strip 109. Moreover, a plurality of spaced fasteners are desirably used so as provide for effective surface contacting engagement between the bottom surface of lighting strip 109 and the top surface of stage 148 on base plate 103 for effective heat transfer therebetween, as discussed previously. It will be clear that the use of individual stages 148 for mounting the respective lighting strips 109 to base plate 103 may be eliminated such that the lighting strips 109 are mounted directly to base plate 103.

Figure 12:
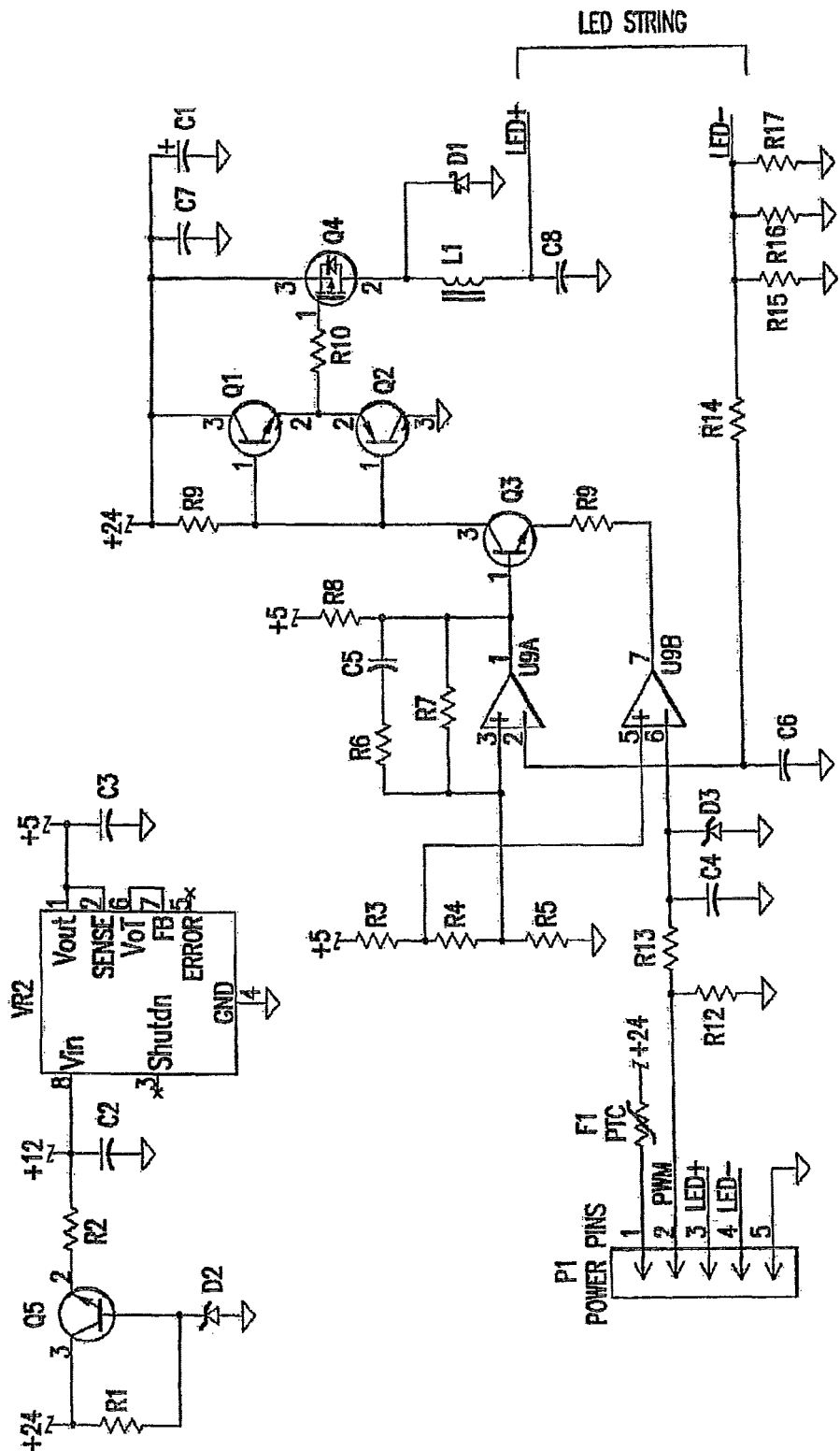
FIG. 12 is a schematic diagram of an exemplary embodiment of a driver circuit for use with the lighting fixture of FIGS. 4A-4B.
Figure 13A:
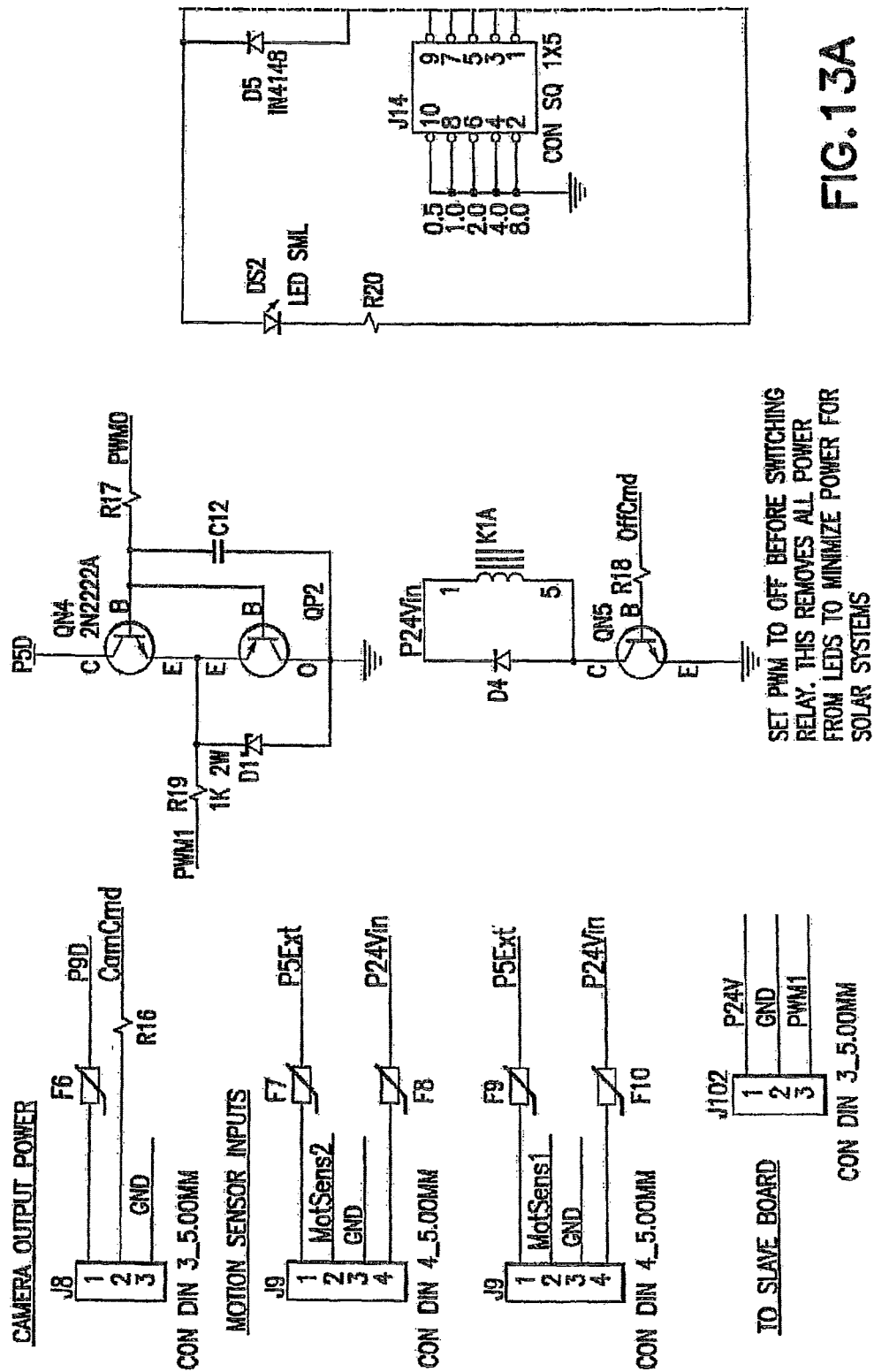
Figure 13B:
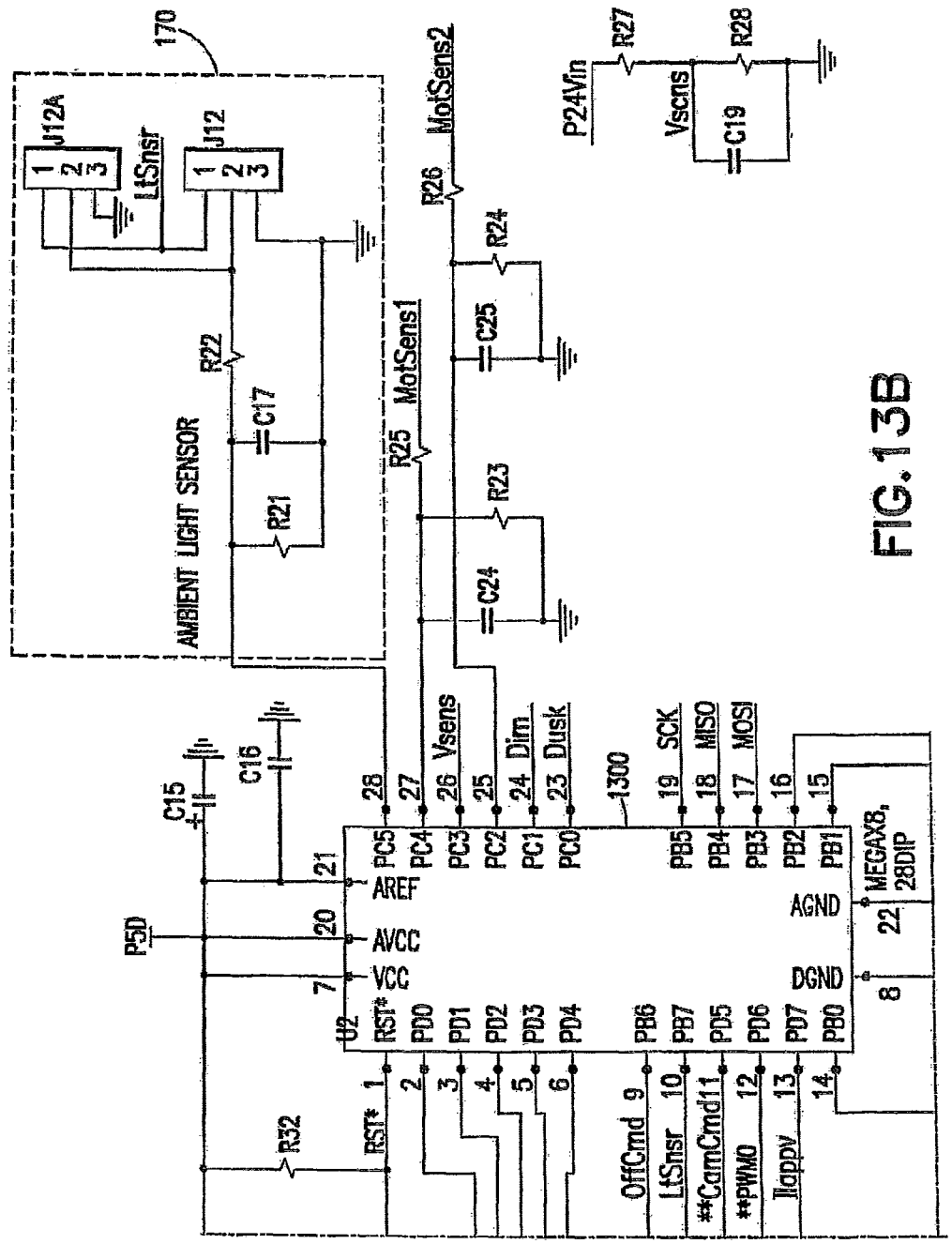
Figure 13C:
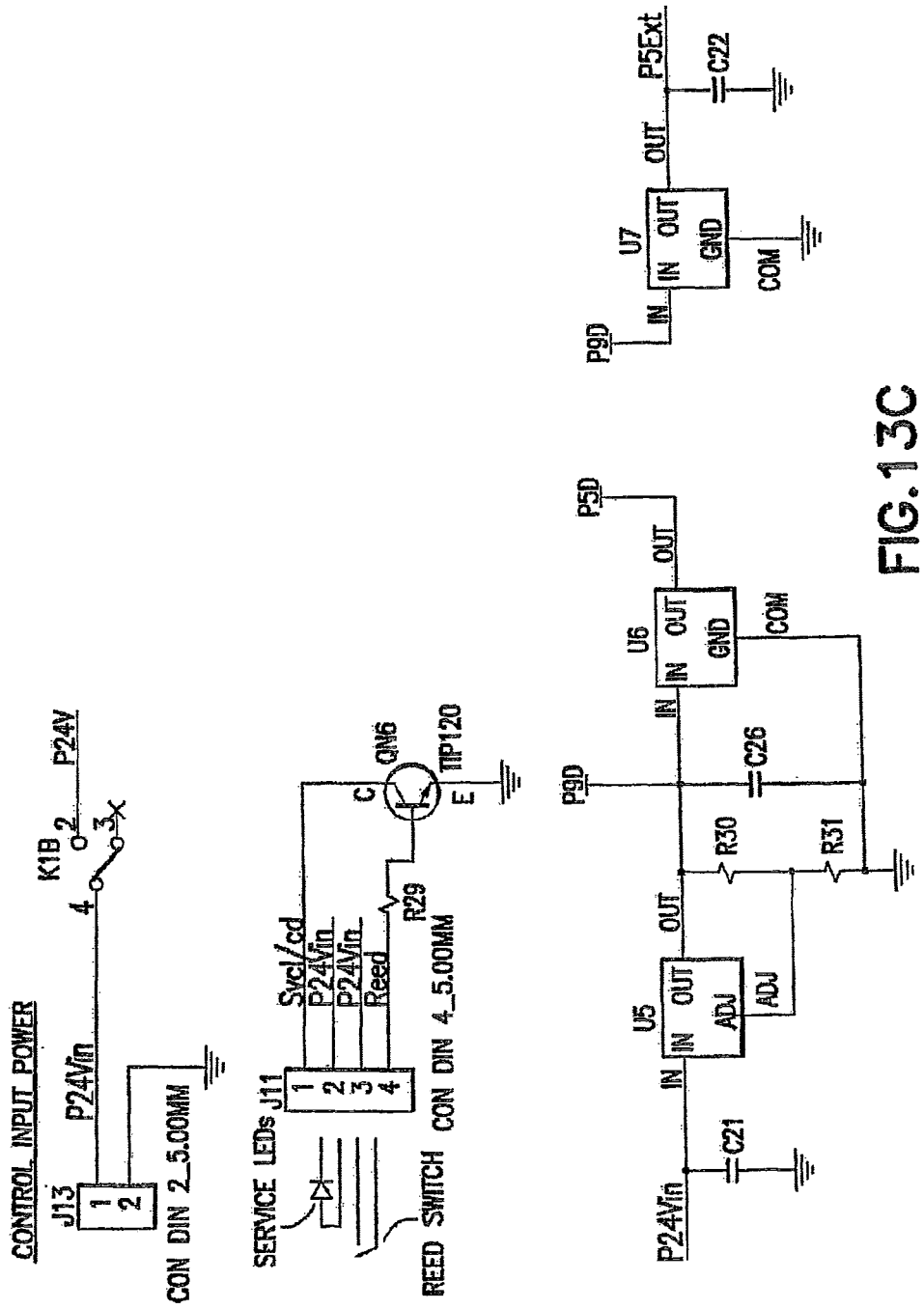

With reference to FIGS. 12 and 13, and with continuing reference to FIGS. 4-7, lighting fixture 101 includes a power supply 151, driver circuit 150 and computer circuit 160. Power supply 151 is desirably positioned within a housing 153 mounted on rear side 107 of base plate 103. Driver circuit 150 and computer circuit 160 are desirably mounted on front side 105 of base plate 103 beneath transparent cover 106, thereby providing effective protection from the environment. Power supply 151 is electrically coupled to a control board in the form of computer circuit 160 via a wire 155 extending through base plate 103. Computer circuit 160 is, in turn, coupled to a driver circuit board 150. Driver circuit 150 is electrically coupled to each lighting strip 109 via individual electrical connectors 149. Driver circuit 150 divides the power output from a power supply 151 equally among the four lighting strips 109 in the present embodiment. Driver circuit 150 is electrically coupled to and controlled by computer circuit 160 to control operation of the individual lighting strips 109.

Each individual LED 111 is electrically connected in series on each respective lighting strip 109. Moreover, each respective lighting strip is connected in parallel to driver circuit 150. Such an arrangement provides the driver circuit 150 with the ability to maintain the amperage constant even in the event that one or more LEDs 111 in any of the respective lighting strips 109 should fail. Such an arrangement also prevents an overload of power to any of the lighting strips 109 or other LEDs 111 thereon in the event of such a failure of one or more LEDs, thereby preventing premature burn out and failure of the remaining working LEDs, such as to prior to replacement of and individual lighting strip 109.

When lighting fixture 101 is used as a street lighting fixture, as an example, a light detector is desirably provided in association with the light fixture 101. In one exemplary form, the light detector comprises a photoelectric eye 170 that is mounted on housing 153 of power supply 151 and is electrically coupled to computer circuit 160. Photoelectric eye 170 is provided to turn on the LEDs 111 when surrounding ambient light has dropped below a predetermined level as will be described hereinafter. An exemplary embodiment of computer circuit 160 is illustrated in FIG. 13. Computer circuit 160 utilizes a microcontroller chip 1300 as the primary means for controlling the light output by lighting fixture 101. However, this is not to be construed as limiting as the use of other circuitry configurations, microprocessors, and microcontrollers may be substituted. Likewise an exemplary embodiment of driver circuit 150 is illustrated in FIG. 12.

As may be inferred from the foregoing, computer circuit 160 is provided for automated control of various functions of lighting fixture 101. For example, computer circuit 160 may include circuitry for controlling a remote camera (not shown) that may be provided with lighting fixture 101. Additionally, computer circuit 160 may include circuitry for interaction with a separate wireless device that is adapted for programming the control board for operation of the lighting fixture. For example, computer circuit 160 may include circuitry to communicate with a separate remote control device via two-way radio-frequency (RF) so as to program the lighting fixture 101. Other communication vehicles for communication with computer circuit 160, such as via infrared (IR) light, are intended to be encompassed by this disclosure. Moreover, lighting fixture 101 may include a solar-power capability for powering computer circuit 160 and lighting strips 109.

Figure 14:
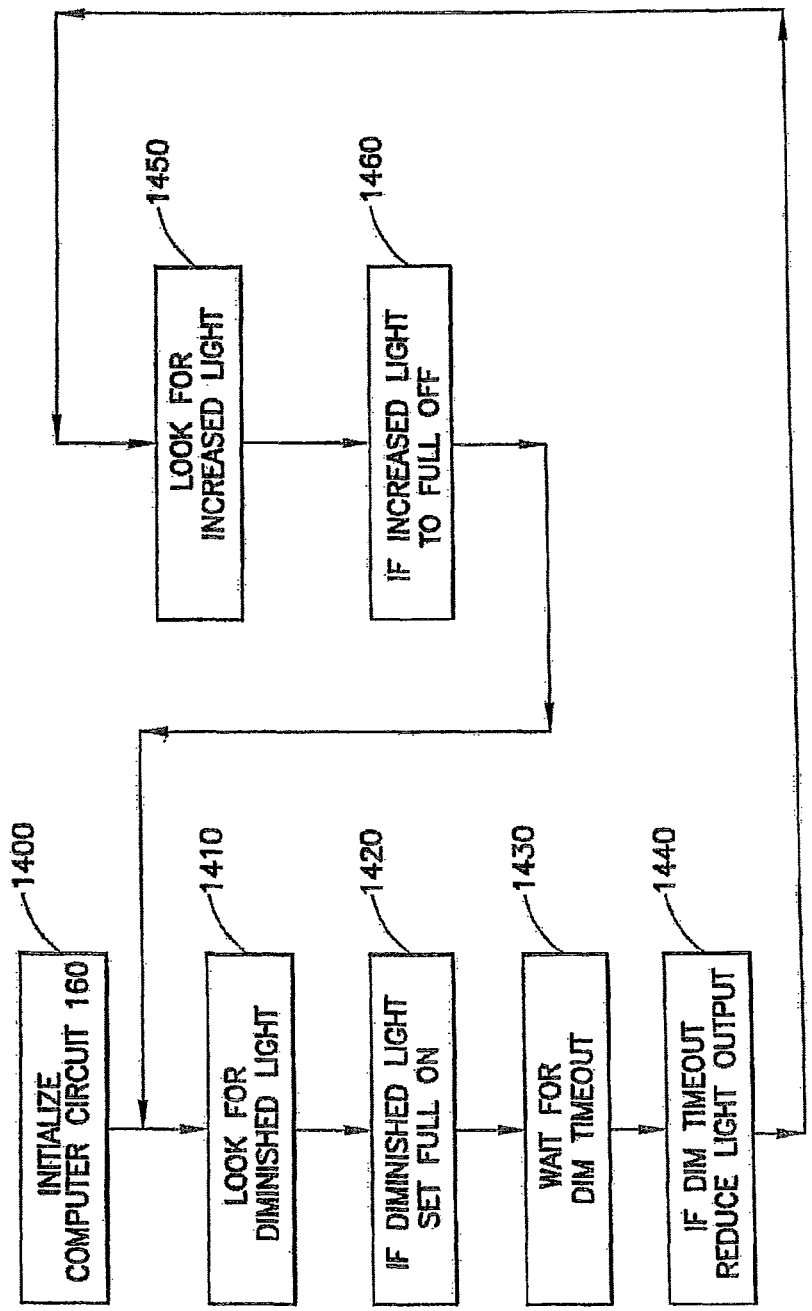
FIG. 14 is an exemplary flow diagram illustrating a possible control sequence for controlling operation of the lighting fixture of FIGS. 4A-4B.

Desirably, computer circuit 160 works in conjunction with photoelectric eye 170 to automatically turn exemplary street lighting fixture 101 on and off based on ambient light conditions, and to adjust the lighting at predetermined time periods. With reference to FIG. 14, the on-off and power adjustment features of lighting fixture 101 are schematically illustrated. First, power is supplied to computer circuit 160 thereby initializing the computer circuit 160 at block 1400. Next, at block 1410, photoelectric eye 170 looks for diminished ambient light, signaling, for example, the arrival of dusk, if the lighting fixture 101 is intended for use as a street lamp, and this information is provided as an input to computer circuit 160. Once sufficiently diminished light (such as at dusk), as detected by photoelectric eye 170, is determined by computer circuit 160, the computer circuit 160 turns lighting fixture 101 on at full power at block 1420.

As an option, at blocks 1430 and 1440, after a predetermined period of time, the power of the light output may be reduced by a predetermined amount for further energy conservation, for example, in the middle of the night when fewer people are likely to be in the vicinity of street lighting fixture 101. For example, if computer circuit 160 turns on the lighting fixture 101 at, for example, dusk, a counter in the computer circuit 160 may begin counting. After a preprogrammed period of time has elapsed, such as six hours, the computer circuit 160 may reduce power to the LEDs 111 to save power. As another alternative, computer circuit 160 may be programmed to turn on the lighting fixture 109 at a scheduled time, such as at 6:00 PM. Then, after a preprogrammed period of time has elapsed, power to the LEDs is reduced by a certain amount, thereby providing for reduced light output and reducing power consumption. The amount of power reduction may be programmed in advance, for example, by reducing power consumption to about 25% to 75% of the full power output at selected point in time after the counting has begun. With the present lighting fixture 101, it has been discovered that the power reduction to light output ratio is not a 1:1 ratio, such that, for example, a 50% reduction in power output continues to provide for an overall light output of the lighting fixture of about 75% of the normal light output, thereby resulting in only about a 25% reduction in light output with a 50% reduction in power.

Thereafter, at block 1450, photoelectric eye 170 looks for increased ambient light signaling, for example, the arrival of dawn. Once sufficient ambient light (such as at dawn) is detected by photoelectric eye 170 at block 1460, LEDs 111 of lighting fixture 101 are turned off by the computer circuit 160 and the process returns to block 1410. In accordance with the foregoing, by reducing power by 25% to 75% after lighting fixture 101 has been on for a predetermined period of time, a savings of up to 90% of power over a current mercury vapor streetlight or high pressure sodium streetlight can be achieved. Additionally, this process extends the life of LEDs 111.

In addition, the controller of computer circuit 160 also provides a safety start feature. The safety start feature allows the LEDs 111 to turn on slowly over a predetermined time interval. The LEDs 111 start at an off position. Once the computer circuit 160 sends a signal to turn on the LEDs 111, the LEDs are turned on at a low power and the power is gradually increased over a predetermined period, such as a 2 to 3 second interval, until full power is reached. The purpose of this safety start feature is to protect the human eye from sudden brightness created when the LEDs 111 are turned on at full power. This feature also prevents "welder's flash" when the LEDs 111 are turned on.

Figure 15:
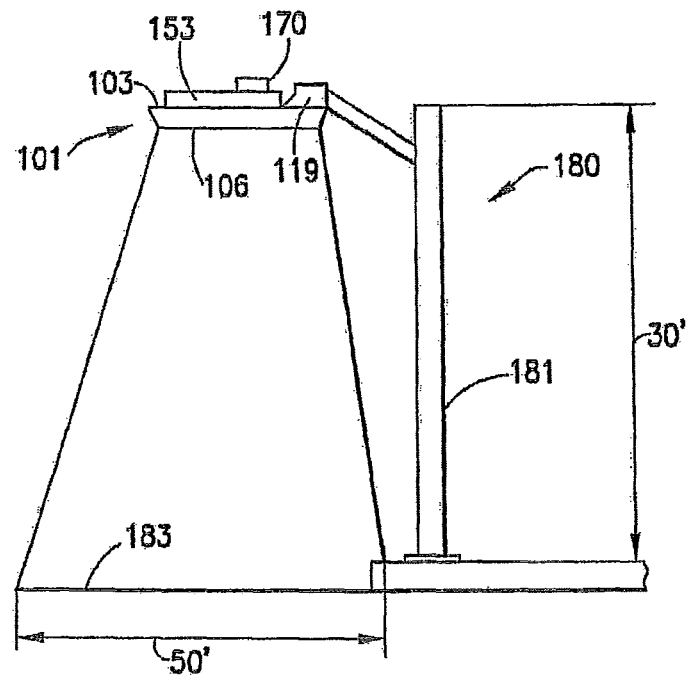
FIG. 15 is a side perspective view of the lighting fixture FIGS. 4A-4B used as a streetlight.

With reference to FIG. 15, and continuing reference to FIGS. 4-7, an exemplary use of lighting fixture 101 is as a streetlight 180. Lighting fixture 101 is configured to be mounted by pole mounting member 119 to a pole 181 at a height sufficient to provide adequate lighting to a street 183 or surface below. For instance, if lighting fixture 101 is mounted on a pole at a height of about 30 feet above a street, lighting fixture 101 provides a lighting pattern that extends about 50 feet from the base of the pole and about 65 feet on either side of the pole. It is further contemplated that lighting fixture 101 can be adapted for other attachment mechanisms, such as a rectangular pole, a surface mount, etc.

In the foregoing use of lighting fixture 101 as a streetlight, the inventors have determined that for providing effective light output at a conventional distance for a streetlight (such as about 25-40 feet from the ground surface), four lighting strips 109 including 8 separate LED chips mounted thereon is particularly useful, with each LED chip rated at 80-120 lumens. For example, the light output with such an arrangement having individual LED chips rated at 107 lumens each represents about 2.5 foot-candles at a distance of 32 feet without any reflectors attached to the lighting strips. When the reflectors are attached to the lighting strips, a similar arrangement with individual LED chips rated at 107 lumens each represents about 6.7 foot-candles at a distance of 32 feet. Accordingly, the reflector arrangement significantly amplifies and intensifies the light output for the lighting fixture 101.

Lighting fixture 101 may be assembled by the following general and non-limiting procedure. First, driver circuit 150 and control circuit 160 are mounted to base plate 103 and electrically interconnected. Then, lighting strips 109 are mounted to base plate 103 via the individual mounting members 143 and/or stages 148 and using suitable fastening means such as mechanical fasteners and the like. Next, each lighting strip 109 is electrically coupled to driver circuit 150 by individual electrical connectors 149. Next, individual reflectors 141 are mounted onto lighting strips 109 as discussed hereinafter with reference to FIG. 16. Transparent cover 106 may then be positioned over base plate 103 and secured thereto with spring clips 115. Pole mounting member 119 is mounted to rear side 107 of base plate 103, and is adapted to cooperate with pole 181 as shown in FIG. 15. Power supply 151 is installed within housing 153 and is electrically connected to control circuit 160 through base plate 103, and light detector 170 is attached to housing 153 and electrically connected to control circuit 160.

Figure 16:
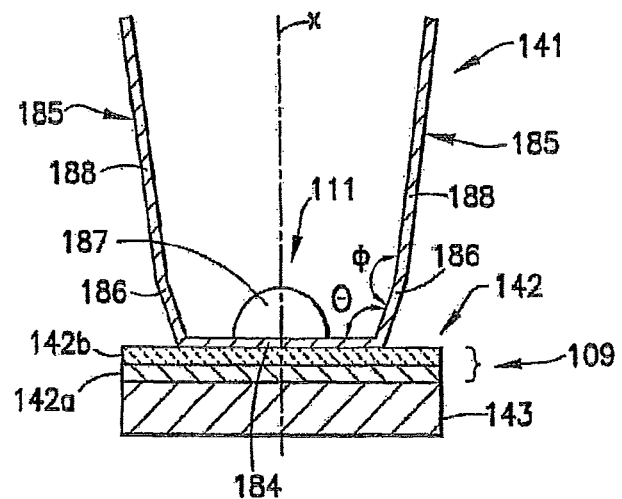
FIG. 16 is cross-sectional view of the lighting emitting diode (LED) lighting strip adapted for use with the lighting fixture of FIGS. 4A-4B illustrating details of a reflector associated with the lighting strip.

With reference to FIG. 16, a cross-sectional view of an exemplary lighting strip 109 having LEDs 111 mounted thereon and a reflector assembly 141 extending therefrom is illustrated. In this exemplary embodiment, the reflector assembly includes a base member 184 and a pair of desirably integral side walls 185 extend from opposite sides of the base member 184 at an angle. Each LED 111 includes a light emitting portion 187. Reflector assembly 141 is mounted to lighting strip 109 such that a bottom edge of each side wall 185 extends from a bottom portion of light emitting portion 187 of LED 111. Each side wall 185 of reflector assembly 141 includes a first facet or first portion 186 defining a first angle θ with the base portion 184 of reflector 141 adjacent the bottom portion of light emitting portion 187 of LED 111, and a second facet or second portion 188 that defines a second angle Φ with first portion 186. The combination of these angles creates facets in side walls 185, thereby creating a multi-faceted side wall which amplifies the light provided by LEDs 111. It is contemplated that the multiple facets reflect the light that is output from the LEDs back toward other facets of the walls of reflector 141, thereby amplifying the light. However, this is not to be construed as limiting as this definition of a multi-faceted reflector may also include reflectors having a parabolic shape. In addition, the arrangement of reflector 141 extending from base member 184 allows all of the light produced by LEDs 111 to be reflected and amplified by reflector 141. The angles in side walls 185 of reflector 141 along with the arrangement of reflector 141 such that it extends from the bottom portion of light emitting portion 187 of LED 111 allows lighting fixture 101 to produce useable light while using a small number of LEDs 111 (e.g., the exemplary embodiment illustrated in FIG. 4 has eight LEDs 111 per lighting strip 109 and four lighting strips 109 for a total of thirty-two LEDs 111).

Figure 17:
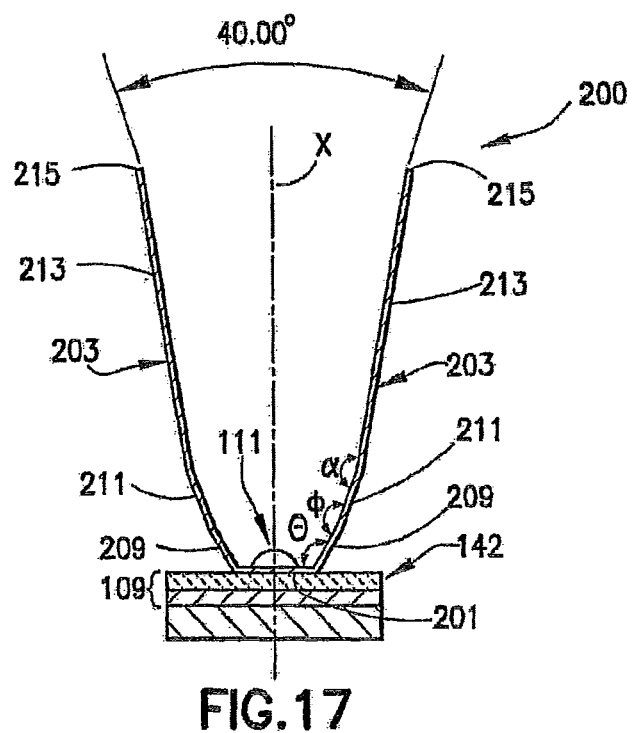
FIG. 17 is a cross-sectional view of another embodiment of the lighting emitting diode (LED) lighting strip adapted for use with the lighting fixture of FIGS. 4A-4B and comprising an alternative reflector.
Figure 18:
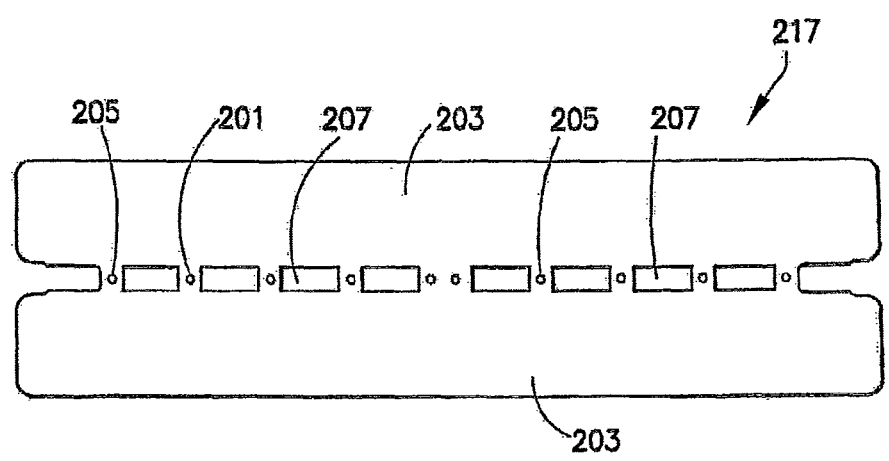
FIG. 18 is a top view of a blank used to manufacture the reflector of FIG. 17.

With reference to FIGS. 17 through 21, exemplary alternative reflectors for use with lighting fixture 1 and lighting fixture 101 are illustrated. FIG. 17 provides a cross-sectional view of a first reflector, generally denoted as reference numeral 200 that is also desirably used when lighting fixture 1 or lighting fixture 101 is used as a streetlight but provides a different effect from the previously discussed embodiment. Reflector 200 includes a base portion or member 201 with a pair of integral side walls 203 extending from opposite sides thereof at an angle. Base member 201 includes a plurality of holes 205 used to fasten reflector 200 to lighting strip 9 or lighting strip 109 using any suitable fastening means. Base member 201 also defines a plurality of gaps or openings 207 formed therein. Base member 201 of reflector 200 is mounted over one of the lighting strips 9 or lighting strips 109 such that surface-mount LEDs 11 or LEDs 111 positioned on lighting strips 9 or strips 109 extend through gaps 207 and side walls 203 of reflector 200 extend at an angle from lighting strip 9 or strip 109.

Each of side walls 203 of reflector 200 has several angles therein as shown in FIG. 17. Each side wall 203 of reflector 200 includes a first portion 209 that extends from base member 201 at a first angle θ of, for example, about 115° to about 130°, such as about 123°. Side walls 203 further include a second portion 211 that defines a second angle Φ with the first portion 209; this angle is approximately between 160° to about 180°, such as about 170°. Finally, side walls 203, in the present configuration, include a third portion 213 that defines a third angle α with the second portion 211; this angle is again about 160° to about 180°, such as about 170°. This configuration creates an overall angle of about 40° between ends 215 of each of side walls 203 of reflector 200. The combination of these angles creates facets in the reflector which amplify the light provided by LEDs 11 or LEDs 111. In addition, side walls 203 of reflector assemblies 200 amplifies the light from each of the plurality of strips 9 or strips 109 of LEDs 11 or LEDs 111 and spreads the light into what appears to be a wash or bath of light.

Reflector 200 is desirably constructed from a sheet of silver-coated aluminum with a protective polymer coating. Such a material has a reflectivity that is from about 95% to 98% reflective. Additionally, the polymer coating prevents corrosion on reflector 200. However, the use of silver-coated aluminum reflectors is not to be construed as limiting as any highly-reflective material may be used to construct the reflector assemblies. Once the sheet of silver-coated aluminum is obtained, each reflector 200 is cut from the sheet desirably using a laser thereby forming a reflector blank, denoted generally as reference numeral 217. Reflector blank 217 is a flat sheet that that shaped to form side walls 203 extending from base member 201, and a plurality of holes 205 and a plurality of gaps 207 are cut in the reflector blank 217 using, for example, a laser. Reflector blank 217 is then bent into the shape discussed hereinabove using a brake press.

Figure 19:
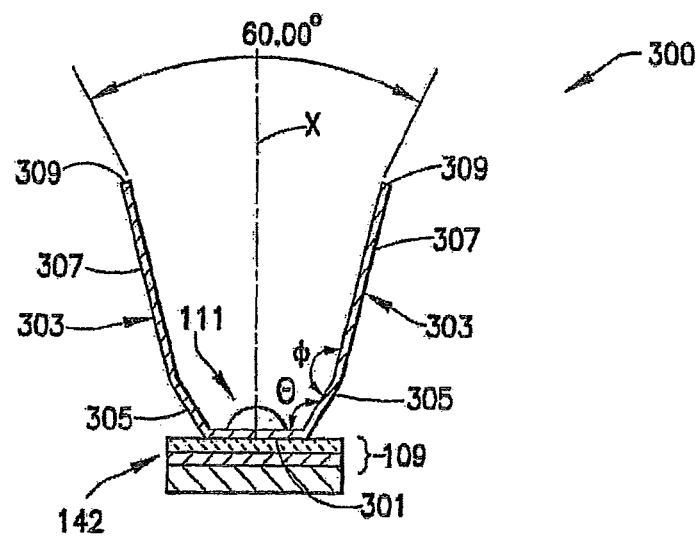
FIG. 19 is a cross-sectional view of additional embodiment of the lighting emitting diode (LED) lighting strip adapted for use with the lighting fixture of FIGS. 4A-4B and comprising an additional embodiment of the reflector.

With reference to FIG. 19, another possible configuration for a reflector is shown. This reflector 300 includes a base portion or member 301 with a pair of integral side walls 303 extending from opposite sides thereof at an angle. Each of side walls 303 of reflector 300 has several angles therein as shown in FIG. 19. Each side wall 303 of reflector 300 includes a first portion 305 that extends from lighting strip 9 or strip 109 at an initial or first angle θ of, for example, about 115° to about 130°, such as about 121°. Side walls 305 of reflector 300 further include a second portion 307 that defines a second angle Φ with the first portion 305; this angle is approximately between 160° to about 180°, such as about 170°. This configuration creates an overall angle of about 60° between ends 309 of each side wall 303 of reflector 300.

The combination of these angles creates facets in side walls 303 of reflector 300 which amplify the light provided by LEDs 11 or LEDs 111. In addition, side walls 303 of reflector 300 direct the light from each of the plurality of lighting strips 9 of LEDs 11 or strips 109 of LEDs 111 and focus the light into what outwardly appears to be a uniform beam of light. Reflector assemblies 300 are constructed from silver-coated aluminum with a protective polymer coating as described previously.

Figure 20:
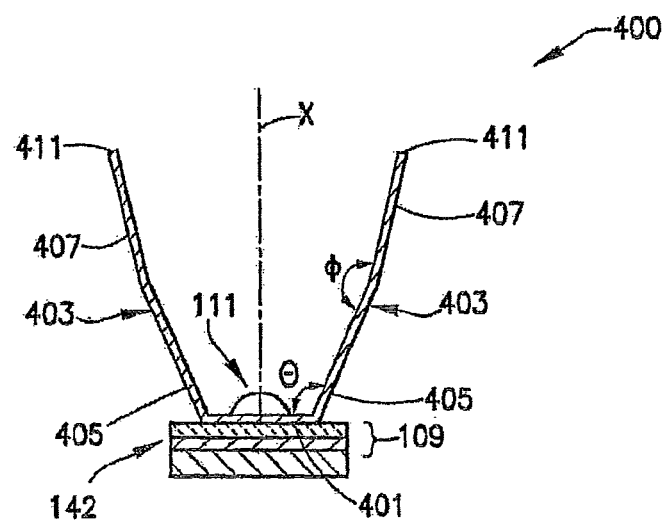
FIG. 20 is a cross-sectional view of a further embodiment of the lighting emitting diode (LED) lighting strip adapted for use with the lighting fixture of FIGS. 4A-4B and comprising a further embodiment of the reflector.
Figure 21:
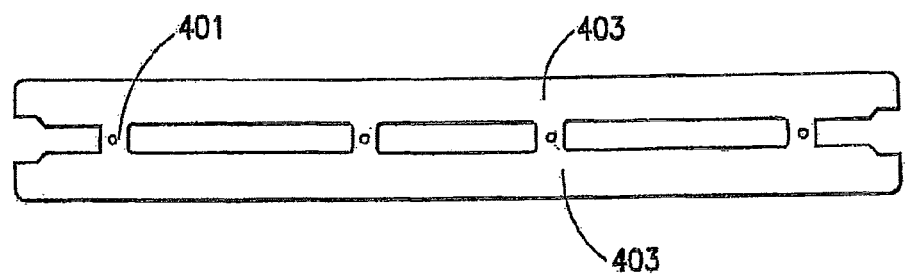
FIG. 21 is a top view of a blank used to manufacture the reflector of FIG. 20.

With reference to FIGS. 20 and 21, yet another possible configuration for a reflector is shown and is denoted generally as reference numeral 400. This reflector 400 includes a base portion or member 401 with a pair of integral side walls 403 extending from opposite sides thereof at an angle. Each side wall 403 of reflector 400 has several angles therein as shown in FIG. 20. Each side wall 403 of reflector 400 includes a first portion 405 that extends from base member 401 at a first angle θ of, for example, about 110° to about 120°, such as about 115°. Side walls 403 further include a second portion 407 that defines a second angle Φ with the first portion 405; this angle is, for example, about 170° to about 180°, such as about 177°. The combination of the foregoing angles creates facets in the reflector 400 that amplify the light provided by LEDs 11 or LEDs 111. In addition, side walls 403 of reflector assemblies 400 direct the light from each of the plurality of lighting strips 9 of LEDs 11 or strips 109 of LEDs 111 and focus the light into what outwardly appears to be a uniform beam of light. Reflector assemblies 400 are also constructed from silver-coated aluminum with a protective polymer coating in like manner to previous embodiments.

While FIGS. 17-21 illustrate possible configurations of the reflector assemblies, this is not to be construed as limiting the present invention as other suitable configurations may be constructed. Various other types of reflectors for use in LED lighting fixtures have been envisioned. For instance, the reflectors may be of a rounded-type with multiple facet angles.

Figure 22:
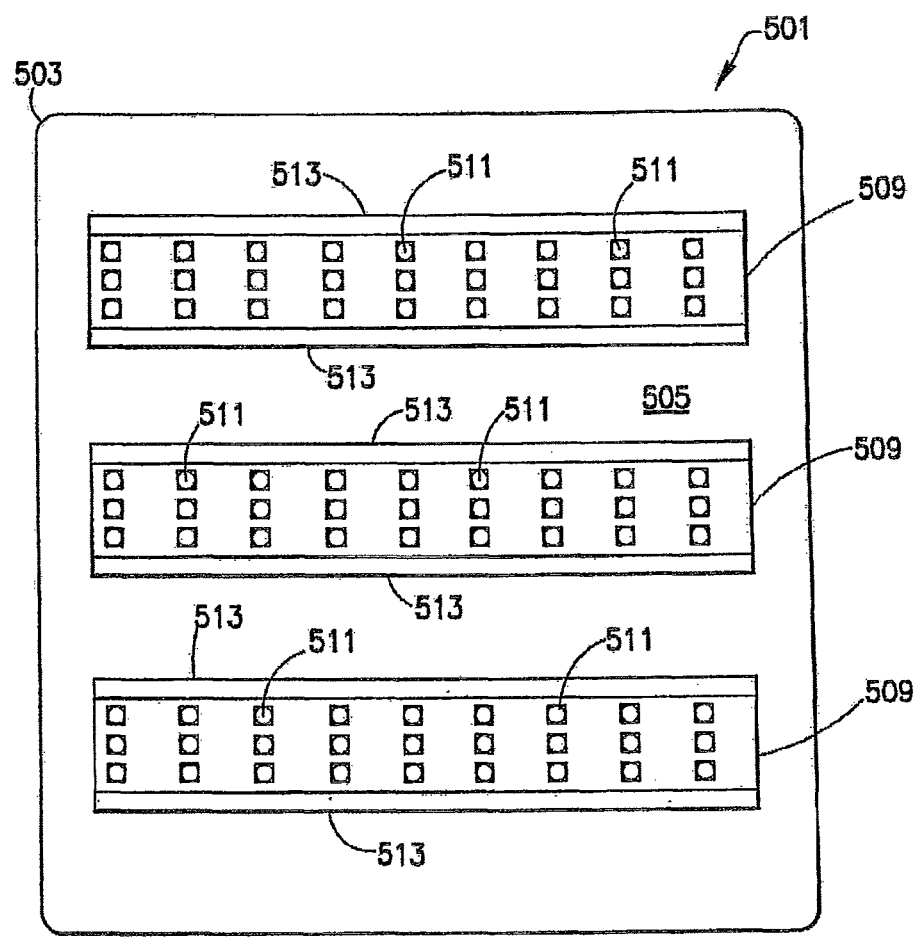
FIG. 22 is a front view of a lighting fixture in accordance with an embodiment adapted for use as an office lighting fixture.

With reference to FIGS. 22-24, a lighting fixture 501, for use as office lighting, includes a base plate 503 having a front side 505 and a rear side 507 defined by a periphery 512. Three strips 509 are mounted on front side 505 of base plate 503. Each strip 509 includes a plurality of surface-mount LEDs 511 mounted thereto. Base plate 503 functions as a heat sink for LEDs 511 and is oversized compared to lighting strips 509 to ensure that LEDs 511 stay cool; base plate 503 has the same heat cooling attributes of base plate 103 discussed previously and the previous discussion of base plate 103 is equally applicable to base plate 503. Base plate 503 provides surface area for cooling LEDs 511 which extends LED life. Lighting fixture 500 is typically intended for indoor use. Accordingly, a sealed cover is not required. A housing 521 is mounted to front side 501 of base plate 503, which also houses a power supply and driver circuitry and a lens cover (not shown). The housing itself is used for installing the fixture in office ceilings and the like.

Figure 25:
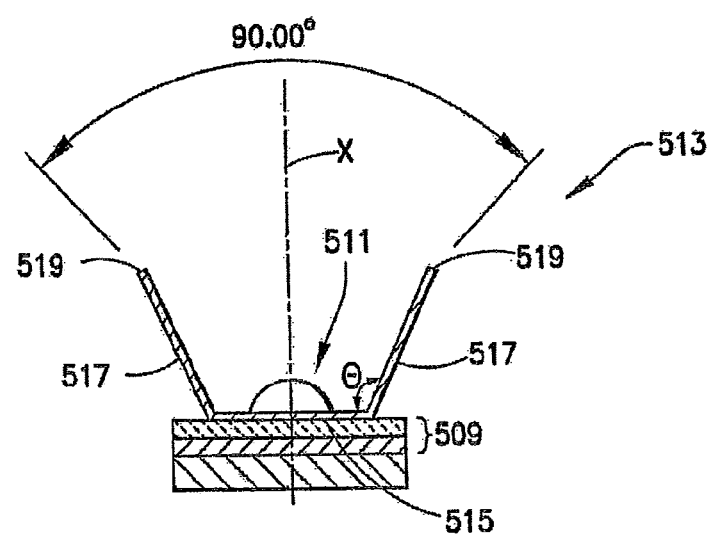
FIG. 25 is a cross-sectional view of a reflector adapted for used with a light emitting diode (LED) lighting strip used in lighting fixture of FIG. 22.

With reference to FIG. 25, and with continuing reference to FIGS. 22-24, reflectors 513 is mounted to front side 505 of base plate 503 such that side walls 517 extend from each of the lighting strips 509. Each reflector 513 includes a base portion or member 515 with a pair of integral side walls 517 extending from opposite sides thereof at an angle. Base member 515 of reflector 513 is mounted on front side 505 of base plate 503 over one of the strips 509 such that surface-mount LEDs 511 positioned on strips 509 extend through gaps or openings formed in base 515, and side walls 517 of reflector 513 extend at an angle from each of the lighting strips 519. Each side wall 517 of reflector 513 extends from base member 515 at an angle θ of, for example, about 115°. This configuration creates an overall angle of about, for example, 90° between ends 519 of each side wall 517 of reflector 513. Side walls 517 of reflector 513 amplify the light provided by LEDs 511. In addition, side walls 517 of reflector 513 direct the light from each of the three strips 509 of LEDs 511 and focus the light into what appears to be a uniform beam of light. Reflectors 513 are desirably constructed from silver-coated aluminum with a protective polymer coating in like manner to previous embodiments.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that this disclosure contemplates that, to the extent possible, one or more features of any embodiment can be combined with one or more features of any other embodiment.

The invention claimed is:

1. A light emitting diode (LED) light fixture comprising:
a base plate having a substantially planar surface having a mounting stage functioning as a heat sink for the LED light fixture;
a lighting strip including at least one LED, the lighting strip being removably mounted to the mounting stage with a reusable attachment mechanism, permitting individual replacement of the lighting strip independently from the mounting stage, the mounting stage forming a channel conducting heat from the lighting strip to the base plate;
a control component mounted to the light fixture independently from the lighting strip, the control component controlling light output by the at least one LED; and
a multi-faceted reflector having at least one planar surface.

2. The light fixture of claim 1, further comprising:
a camera configured to be controlled remotely via the control component.

3. The light fixture of claim 1, further comprising:
a power supply that converts AC power to DC power; and
a wireless communication component, wherein the wireless communication component communicates with a remote control component, and wherein the control component receives remote programming via the wireless communications component for controlling the lighting fixture.

4. The light fixture of claim 3, further comprising:
a separate driver component that manages the flow of power from the power supply to the at least one LED.

5. The light fixture of claim 3, wherein the wireless communication component communicates by two way radio frequency communication.

6. The light fixture of claim 3, wherein the wireless communication component communicates by infrared communication.

7. The light fixture of claim 1, wherein the control component adjusts the amount of light output by the at least one LED.

8. The light fixture of claim 7, wherein the control component reduces the light output of the at least one LED during an interval of time.

9. The light fixture of claim 8, wherein the control component reduces the light output of the at least one LED at a programmed time.

10. The light fixture of claim 8, wherein the control component reduces the light output of the at least one LED after a predetermined period of time has elapsed from the time that the light fixture turned on.

11. The light fixture of claim 7, wherein the control component reduces the light output by reducing the power output to the at least one LED to a range of approximately 25-75% of a full power output.

12. The light fixture of claim 1, wherein the control component controls when the light fixture is turned on and turned off.

13. The light fixture of claim 12, wherein the control component turns the light on and off at programmed times.

14. The light fixture of claim 1, further comprising:
a light detector that senses ambient light,
wherein the control component turns the light fixture on when the light sensor senses that the ambient light falls below a first predetermined level.

15. The light fixture of claim 14, wherein the control component turns the light fixture off when the light detector senses that the ambient light is above a second predetermined level.

16. The light fixture of claim 15, further comprising:
a wireless control component that receives variable remote programming of the first and second predetermined levels of ambient light from a remote control location.

17. The light fixture of claim 14, further comprising:
a housing, wherein the light detector is positioned within the housing;
a window formed in the housing; and
at least one of an acrylic rod and a fiber optic array that transfers light from the window to the light detector.

18. The light fixture of claim 1, wherein the control component controls the at least one LED to turn on and to operate at different levels of light over a predetermined time interval.

19. The light fixture of claim 1, further comprising:
a solar-power source for powering the control component.

20. The light fixture of claim 1, wherein the control component is mounted as an integral component within the light fixture, and wherein the light is configured to operate with the control component.

21. The light fixture of claim 1, wherein the control component is mounted integrally within the light fixture.

22. The light fixture of claim 1,
the substantially planar surface of the base plate having the mounting stage on a first side and the control component on a second side.

23. A light emitting diode (LED) light fixture comprising:
a base plate mounted integrally within the light fixture;
at least one LED releasably coupled to the base plate via a mounting stage connected to a substantially planar surface of the base plate, permitting individual replacement of the LED independently from the base plate and mounting stage, the mounting stage conducting heat from the at least one LED to the base plate;
a control component mounted integrally within the light fixture, the control component controlling light output by the at least one LED; and a multi-faceted reflector having at least one planar surface.

24. A light emitting diode (LED) light fixture comprising:
a lighting strip including at least one LED, the lighting strip being removably mounted to a substantially planar surface of the light fixture via a mounting stage having a channel, wherein the lighting strip may be replaced without removal of the mounting stage;
a control component mounted to the light fixture independently from the lighting strip, the control component controlling light output by the at least one LED; and
a multi-faceted reflector having at least one planar surface.

* * * * *